United States Patent
Abali et al.

(10) Patent No.: US 12,066,935 B2
(45) Date of Patent: Aug. 20, 2024

(54) CACHE LINE COMPRESSION PREDICTION AND ADAPTIVE COMPRESSION

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US); Brian Robert Prasky, Campbell Hall, NY (US); Deanna Postles Dunn Berger, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/696,089

(22) Filed: Mar. 16, 2022

(65) Prior Publication Data

US 2023/0315627 A1     Oct. 5, 2023

(51) Int. Cl.
| | | |
|---|---|---|
| *G06F 12/08* | (2016.01) | |
| *G06F 12/0802* | (2016.01) | |
| *G06F 12/12* | (2016.01) | |

(52) U.S. Cl.
CPC .......... *G06F 12/0802* (2013.01); *G06F 12/12* (2013.01); *G06F 2212/60* (2013.01)

(58) Field of Classification Search
CPC ... G06F 12/0802; G06F 12/12; G06F 2212/60
See application file for complete search history.

(56) References Cited

U.S. PATENT DOCUMENTS

| | | | |
|---|---|---|---|
| 5,517,657 A | 5/1996 | Rodgers et al. | |
| 7,143,238 B2 | 11/2006 | Adl-Tabatabai et al. | |
| 7,162,584 B2 | 1/2007 | Adl-Tabatabai et al. | |
| 8,217,813 B2 | 7/2012 | O'Connor | |
| 9,146,933 B2 | 9/2015 | Matsuse | |
| 9,330,001 B2 | 5/2016 | Arelakis et al. | |
| 2003/0145172 A1 | 7/2003 | Galbraith et al. | |
| 2005/0071562 A1 | 3/2005 | Adl-Tabatabai et al. | |
| 2005/0144387 A1 | 6/2005 | Adl-Tabatabai et al. | |
| 2005/0144388 A1 | 6/2005 | Newburn et al. | |
| 2006/0101206 A1* | 5/2006 | Wood .................. | G06F 12/0802 711/E12.017 |

(Continued)

FOREIGN PATENT DOCUMENTS

| | | |
|---|---|---|
| CN | 1853170 A | 10/2006 |
| CN | 1902603 B | 5/2010 |
| CN | 101419574 B | 6/2014 |

OTHER PUBLICATIONS

Notification of Transmittal of the International Search Report and the Written Opinion of the International Searching Authority, or the Declaration, International Application No. PCT/CN2023/076508, dated Apr. 21, 2023, 7 pgs.

(Continued)

*Primary Examiner* — Jae U Yu
(74) *Attorney, Agent, or Firm* — Peter J. Edwards

(57) ABSTRACT

A central processing unit (CPU) system including a CPU core can include an adaptive cache compressor, which is capable of monitoring a miss profile of a cache. The adaptive cache compressor can compare the miss profile to a miss threshold. Based on this comparison, the adaptive cache compressor can determine whether to enable compression of the cache.

20 Claims, 12 Drawing Sheets

(56) References Cited

U.S. PATENT DOCUMENTS

| | | | |
|---|---|---|---|
| 2008/0148026 A1 | 6/2008 | Dhodapkar et al. | |
| 2009/0024835 A1 | 1/2009 | Fertig et al. | |
| 2009/0204798 A1 | 8/2009 | Alexander et al. | |

OTHER PUBLICATIONS

Chen et al., "C-Pack: A High-Performance Microprocessor Cache Compression Algorithm," IEEE Transactions on Very Large Scale Integration (VLSI) Systems, vol. 18, No. 8, Sep. 1, 2009, 13 pages.

Hong et al., "Touche: Towards Ideal and Efficient Cache Compression by Mitigating Tag Area Overheads," MICRO 52: Proceedings of the 52nd Annual IEEE/ACM International Symposium on Microarchitecture, Sep. 2, 2019, 14 pages.

De Castro et al., "Adaptive Compressed Caching: Design and Implementation," Department of Computer Science, Brazil, IBM T.J. Watson Research Center, USA, Nov. 2003, 15 pages.

Arunkumar et al., "LATTE-CC: Latency Tolerance Aware Adaptive Cache Compression Management for Energy Efficient GPUs," 2018 IEEE International Symposium on High Performance Computer Architecture, Feb. 2018, 14 pages.

Alameldeen et al., "Adaptive Cache Compression for High-Performance Processors," Proceedings of the 31st Annual International Symposium on Computer Architecture (ISCA'04), IEEE Computer Society, Jun. 2004, 12 pages.

Abali et al., "Cache Line Compression Prediction and Adaptive Compression ," U.S. Appl. No. 17/696,032, filed Mar. 16, 2022.

List of IBM and IBM Patent Applications Treated as Related, Dated Mar. 12, 2022, 2 pages.

Park, et al., "HoPE: Hot-Cacheline Prediction for Dynamic Early Decompression in Compressed LLCs," ACM Transactions on Design Automation of Electronic Systems, vol. 22, No. 3, Article 40, Apr. 2017, 25 pages.

* cited by examiner

CACHE LINE COMPRESSION PREDICTION AND ADAPTIVE COMPRESSION

BACKGROUND

The systems and methods of the present disclosure relate to cache line compression and decompression.

In computer technology, a "cache" often refers to a data storage structure that can be accessed by a central processing unit (CPU) relatively quickly. In a typical scenario, when an application requires data, it will check a cache to determine if the data is already available in the cache. If it is, the application can retrieve the data quickly by reading a line of the cache containing the data. If the data is not in the cache, the application must acquire it from another source, such as a different cache, memory, or a hard drive.

Storage capacity of memory structures often have a generally inverse relationship with access speed; hard drives typically have the largest storage capacity but take the longest to access, random access memory (RAM) typically has substantially less storage capacity than a hard drive but can be accessed much faster, while a processor cache may have the least storage space but may have the fastest access times. In addition, many systems use multiple "levels" of caches, labeled as an L1 cache, an L2 cache, etc. Typically, the lower-level caches are smaller, but faster, so for example, a CPU may check an L1 cache for needed data first, then an L2 cache, an L3 cache, then RAM, and finally a hard drive, until the data is found.

Because caches are particularly fast, many approaches exist to optimize their usage. For example, management of what data is stored in a cache is a significant area of focus. If a cache is full, adding new data to the cache requires removing other data from the cache, a process known as "evicting."

One area of focus in cache management is cache compression; data stored in a cache can be compressed to save room in the cache, allowing additional data to be stored in the cache. This comes with a tradeoff, as the compressed cache data must typically be decompressed before it can be utilized, and this decompression requires additional time/resources. In addition, some cache lines cannot be or are not worthy to be compressed (such as instructions because of limited data patterns). Further, it can take additional time/resources to determine that the compressed data is compressed in the first place. Thus, a system capable of predicting whether cache lines are compressed or not would be particularly advantageous.

In addition, when a line in a compressed cache is needed multiple times, it is typically decompressed every time. Because of this, if the compressed cache line is needed frequently, the decompression time (alternatively, "decompression penalty" or "decompression cost") can add up to outweigh the savings enabled by compression in the first place. As an example, an L3 cache may have capacity to store a single uncompressed line, or two compressed lines. Reading an uncompressed line from an L3 cache may take 18 cycles, while reading the same line from RAM may take 10 times longer (i.e., 180 cycles). However, if the cache is compressed, decompressing the line may take an additional 4 cycles (for a total read time of 22 cycles). Thus, if compressing the cache saves enough room to store a second (compressed) line in the same cache, then when the second line is needed, reading it from the cache rather than accessing RAM can save several cycles (i.e., 180−18−4=158 cycles saved). However, in this example, if the first line is read 50 times as often as the second line, then on average, every time the second line is read (saving 158 cycles), the first line has been read and decompressed 50 times (costing 50*4 cycles=200 cycles). Therefore, in this example, compressing the cache in order to cache the second line actually results in worse performance on average (158 cycle savings−200 cycle cost=−42 cycles overall added latency). Thus, compressing caches can be not only less useful, but actually counterproductive. Thus, a system capable of intelligently determining when to compress a cache would be particularly advantageous.

Machine learning generally refers to computer systems capable of evolving ("learning") over time. In particular, machine learning systems can "discover" ways to perform designated tasks without having been explicitly programmed to perform them. For example, a machine learning system may be configured to identify objects in an image. In order to accomplish this, the system may make guesses as to the objects in the image, compare those guesses to known answers, and adjust itself based on discrepancies between its guesses and the known answers. The system may repeat this process repeatedly (known as "training"), over time refining its process until it is accurate enough to reliably identify objects.

SUMMARY

Some embodiments of the present disclosure can be illustrated as a first method. The first method includes reading a cache line of a cache. The first method also includes predicting whether the cache line is a compressed cache line or an uncompressed cache line. This first method can therefore advantageously enable informing a CPU core whether the cache line is compressed or uncompressed earlier than prior art systems, reducing unexpected decompression cycle penalties.

Some embodiments of the present disclosure can be illustrated as a second method. This second method includes the steps of the first method, and also includes checking a line bit of each line included in a congruence class. The second method also includes setting a class bit associated with a congruence class based on the line bit, where the prediction is based on the class bit. This second method advantageously enables the prediction of the first method but with reduced resource cost, by utilizing congruence-class based tracking and prediction.

Some embodiments of the present disclosure can be illustrated as a third method. The third method includes the steps of the first method, and also includes determining an amount of compressed lines stored in the cache and an amount of total lines stored in the cache. The third method also includes comparing these numbers of lines and determining a likelihood of whether the cache line is compressed. In this third method, the prediction is based on comparing that likelihood to a prediction threshold. This third method advantageously enables the prediction of the first method but trading prediction accuracy for substantially reduced resource cost.

Some embodiments of the present disclosure can be illustrated as a first system. The first system may comprise memory and a central processing unit (CPU). The CPU of the first system may be configured to execute instructions to read a cache line of a cache. The CPU of the first system may also be configured to execute instructions to predict whether the cache line is a compressed cache line or an uncompressed cache line. This first system therefore advantageously enables informing a core of the CPU whether the cache line is compressed or uncompressed earlier than prior art systems, reducing unexpected decompression cycle penalties.

Some embodiments of the present disclosure can be illustrated as a second system. The second system may comprise memory and a central processing unit (CPU). The CPU of the second system may be configured to execute instructions to read a cache line of a cache. The CPU of the second system may also be configured to execute instructions to predict whether the cache line is a compressed cache line or an uncompressed cache line. The CPU of the second system may also be configured to execute instructions to check a line bit of each line included in a congruence class. The CPU of the second system may also be configured to execute instructions to set a class bit associated with a congruence class based on the line bit, where the prediction is based on the class bit. This second system advantageously enables prediction similar to the first system but with reduced resource cost, by utilizing congruence-class based tracking and prediction.

Some embodiments of the present disclosure can be illustrated as a third system. The third system may comprise memory and a central processing unit (CPU). The CPU of the third system may be configured to execute instructions to read a cache line of a cache. The CPU of the third system may also be configured to execute instructions to predict whether the cache line is a compressed cache line or an uncompressed cache line. The CPU of the third system may also be configured to execute instructions to determine an amount of compressed lines stored in the cache and an amount of total lines stored in the cache. The CPU of the third system may also be configured to execute instructions to compare these amounts of lines and to determine a likelihood of whether the cache line is compressed. The CPU of the third system may also be configured to execute instructions to compare the likelihood to a prediction threshold. Using this third system, the prediction is based on this comparison. This third method advantageously enables the prediction of the first method but allows the option of trading prediction accuracy for substantially reduced resource cost.

Some embodiments of the present disclosure can be illustrated as a first computer program product comprising a computer readable storage medium having program instructions embodied therewith, the program instructions executable by a computer to cause the computer to read a cache line of a cache. The program instructions of the first computer program product are also executable to cause the computer to predict whether the cache line is a compressed cache line or an uncompressed cache line. This first computer program product can therefore advantageously enable informing a CPU core whether the cache line is compressed or uncompressed earlier than prior art systems, reducing unexpected decompression cycle penalties.

Some embodiments of the present disclosure can be illustrated as a second computer program product comprising a computer readable storage medium having program instructions embodied therewith, the program instructions executable by a computer to cause the computer to cause the computer to read a cache line of a cache. The program instructions of the second computer program product are also executable to cause the computer to predict whether the cache line is a compressed cache line or an uncompressed cache line. The program instructions of the second computer program product are also executable to cause the computer to check a line bit of each line included in a congruence class. The program instructions of the second computer program product are also executable to cause the computer to set a class bit associated with a congruence class based on the line bit, where the prediction is based on the class bit. This second computer program product advantageously enables the prediction of the first method but with reduced resource cost, by utilizing congruence-class based tracking and prediction.

Some embodiments of the present disclosure can be illustrated as a third computer program product comprising a computer readable storage medium having program instructions embodied therewith, the program instructions executable by a computer to cause the computer to cause the computer to read a cache line of a cache. The program instructions of the third computer program product are also executable to cause the computer to predict whether the cache line is a compressed cache line or an uncompressed cache line. The program instructions of the third computer program product are also executable to cause the computer to determine an amount of compressed lines stored in the cache and an amount of total lines stored in the cache. The program instructions of the third computer program product are also executable to cause the computer to compare these numbers of lines and determine a likelihood of whether the cache line is compressed. The program instructions of the third computer program product are also executable to cause the computer to compare the likelihood to a prediction threshold. Using this third computer program product, the prediction is based on this comparison. This third computer program product advantageously enables the prediction of the first computer program product, but allows the option of trading prediction accuracy for substantially reduced resource cost.

Some embodiments of the present disclosure can also be illustrated as a fourth method. The fourth method includes monitoring a miss profile of a cache. The fourth method also includes comparing the miss profile to a miss threshold. The fourth method also includes determining (based on the comparison) whether to enable compression of the cache. This fourth method advantageously enables adaptive cache compression, which can change depending on performance of the cache.

Some embodiments of the present disclosure can also be illustrated as a fifth method. The fifth method includes detecting a read request of a line in a cache. The fifth method also includes simulating performance of the cache in a scenario where the line is compressed. The fifth method also includes simulating performance of the cache in a different scenario where the line is uncompressed. The fifth method also includes comparing the simulated performances and, based on the comparison, determining whether to compress the cache. This fifth method advantageously enables adaptive cache compression, intelligently deciding whether compression would be beneficial or not.

Some embodiments of the present disclosure can also be illustrated as a sixth method. The sixth method includes identifying whether a cache line is in a most recently used (MRU) group of a least recently used (LRU) stack. The sixth method also includes determining (based on the identifying) whether to compress the cache line. This sixth method advantageously enables compression of some (but not necessarily all) cache lines of a cache. Compression of cache lines based on LRU stack position can balance benefits of compression (i.e., more cache storage space) with its costs (i.e., slower read times).

Some embodiments of the present disclosure can also be illustrated as a fourth system. The fourth system includes memory and a central processing unit (CPU). The CPU of the fourth system can be configured to execute instructions to monitor a miss profile of a cache. The CPU of the fourth system can also be configured to execute instructions to compare the miss profile to a miss threshold. The CPU of the fourth system can also be configured to execute instructions to determine (based on the comparison) whether to enable compression of the cache. This fourth system advantageously enables adaptive cache compression, which can change depending on performance of the cache.

Some embodiments of the present disclosure can also be illustrated as a fifth system. The fifth system includes memory and a central processing unit (CPU). The CPU of the fifth system can be configured to execute instructions to detect a read request of a line in a cache. The CPU of the fifth system can also be configured to execute instructions to simulate performance of the cache in a scenario where the line is compressed. The CPU of the fifth system can also be configured to execute instructions to simulate performance of the cache in a different scenario where the line is uncompressed. The CPU of the fifth system can also be configured to execute instructions to compare the simulated performances and, based on the comparison, determine whether to compress the cache. This fifth system advantageously enables adaptive cache compression, intelligently deciding whether compression would be beneficial or not.

Some embodiments of the present disclosure can also be illustrated as a sixth system. The sixth system includes memory and a central processing unit (CPU). The CPU of the sixth system can be configured to execute instructions to identify whether a cache line is in a most recently used (MRU) group of a least recently used (LRU) stack. The CPU of the sixth system can also be configured to execute instructions to determine (based on the identifying) whether to compress the cache line. This sixth system advantageously enables compression of some (but not necessarily all) cache lines of a cache. Compression of cache lines based on LRU stack position can balance benefits of compression (i.e., more cache storage space) with its costs (i.e., slower read times).

Some embodiments of the present disclosure can also be illustrated as a fourth computer program product comprising a computer readable storage medium having program instructions embodied therewith, the program instructions executable by a computer to cause the computer to monitor a miss profile of a cache. The program instructions of the fourth computer program product are also executable to cause the computer to compare the miss profile to a miss threshold. The program instructions of the fourth computer program product are also executable to cause the computer to determine (based on the comparison) whether to enable compression of the cache. This fourth computer program product advantageously enables adaptive cache compression, which can change depending on performance of the cache.

Some embodiments of the present disclosure can also be illustrated as a fifth computer program product comprising a computer readable storage medium having program instructions embodied therewith, the program instructions executable by a computer to cause the computer to detect a read request of a line in a cache. The program instructions of the fifth computer program product are also executable to cause the computer to simulate performance of the cache in a scenario where the line is compressed. The program instructions of the fifth computer program product are also executable to cause the computer to simulate performance of the cache in a different scenario where the line is uncompressed. The program instructions of the fifth computer program product are also executable to cause the computer to compare the simulated performances and, based on the comparison, determine whether to compress the cache. This fifth computer program product advantageously enables adaptive cache compression, intelligently deciding whether compression would be beneficial or not.

Some embodiments of the present disclosure can also be illustrated as a sixth computer program product comprising a computer readable storage medium having program instructions embodied therewith, the program instructions executable by a computer to cause the computer to identify whether a cache line is in a most recently used (MRU) group of a least recently used (LRU) stack. The program instructions of the sixth computer program product are also executable to cause the computer to determine (based on the identifying) whether to compress the cache line. This sixth computer program product advantageously enables compression of some (but not necessarily all) cache lines of a cache. Compression of cache lines based on LRU stack position can balance benefits of compression (i.e., more cache storage space) with its costs (i.e., slower read times).

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
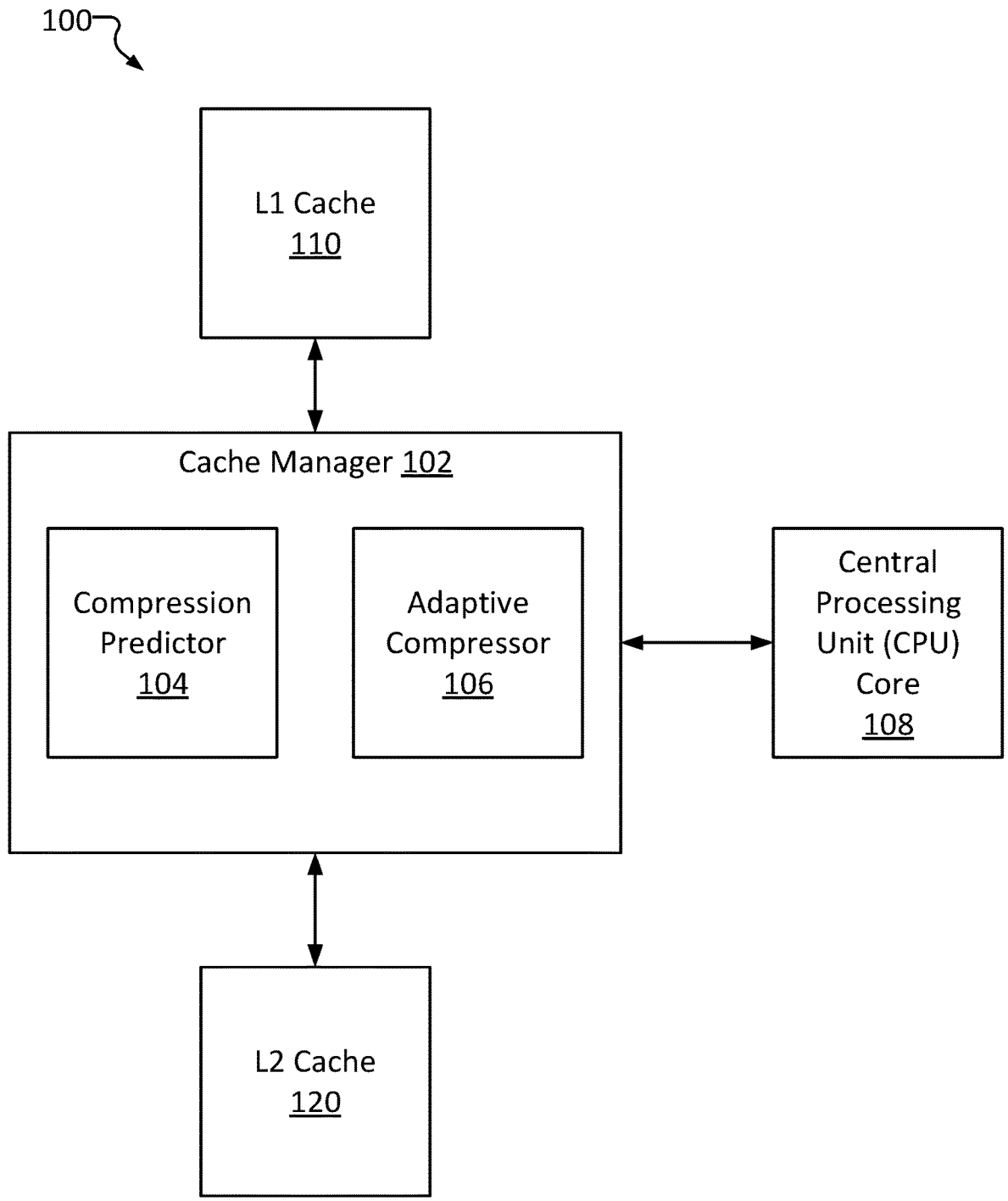
FIG. 1 is a diagram of a predictive/adaptive cache compression system, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to predict uncompressed cache lines. More particular aspects relate to a central processing unit (CPU) including a cache, a CPU core coupled to the cache, and a compression predictor coupled to the CPU core, the compression predictor configured to predict whether a cache line in the cache is a compressed line or an uncompressed cache line. This can advantageously enable the CPU core to be informed of whether the cache line is compressed or uncompressed earlier than prior art systems, reducing unexpected decompression cycle penalties.

Additional aspects of the present disclosure relate to systems and methods to adaptively compress cache lines. More particular aspects relate to a central processing unit (CPU) including a cache, a CPU core coupled to the cache, and an adaptive compressor coupled to the CPU core, the adaptive compressor configured to determine whether to enable compression of the cache. This determination can be based on simulated performance, tracked performance, and/or position of various lines within the cache. This can advantageously enable the CPU core to adapt to changing circumstances, keeping a balance between compression benefits and costs.

In order to configure processing pipelines efficiently and effectively, it can be important to reduce ambiguity and/or uncertainty in processing times. Even when a cache is "fully" compressed, some cache lines may be uncompressible, and therefore attempting to decompress them may be a waste of time. This can cause delays in pipelining execution because the central processing unit (CPU) may not know whether cache lines are compressed or uncompressed. As a simple example, a CPU unexpectedly needing to decompress a cache line can cause a 4-cycle delay, which can have cascading delays down an execution pipeline (e.g., a different thread may need to wait for those 4 additional cycles when it could have been doing something else in the meantime, etc.). If the CPU was informed ahead of time that the incoming line was compressed, the CPU would still need to spend 4 cycles decompressing the cache line, but it may have been able to schedule operations differently to mitigate cascading effects. For similar reasons, an unexpected 3-cycle delay can have a more serious performance impact than a "known" 4-cycle delay.

As an example, instructions that depend upon the compressed data might be issued for execution prior to the data return such that the execution pipeline stage that needs to leverage the data return can be lined up just in time to get this data via a bypass. In simpler terms, execution of instructions can involve multiple "moving parts" that must be precisely coordinated with little room for error. If it turns out the needed data is delayed from an unanticipated decompressing process (or any other process), those instructions may need to be rescinded and issued again as they likely cannot be held as there is other content in the prior pipeline cycle that expects to move forward every cycle. In other words, unexpected delays can cause additional unexpected delays, which in turn can cause their own unexpected delays, and so on. Thus, if an instruction appears unable to be executed on time, it is typically more efficient to simply give up and move on (such as by recycling the instruction to be issued again) than to wait until it is able to be completed. Further delay may even be added based on the minimal number of cycles it takes to recycle an instruction through the execution pipeline as the minimal recycle penalty could be greater than the decompression delay.

In view of this, systems and methods consistent with the present disclosure provide a compression predictor configured to predict whether incoming cache lines (i.e., cache lines that have been requested and are being sent to the CPU) are compressed or uncompressed prior to acquiring data from the cache and the cache directory. The predictor can then send a "warning" to the CPU that an upcoming line will (or will not) need to be decompressed. Further, this warning can be sent in time for the CPU to make adjustments to dataflow, which can improve efficiency in pipeline management. In some embodiments, the predictor can be implemented with adaptive cache compression to further boost performance.

The uncompressed cache line predictor (alternatively, "predictor") can be implemented in several configurations. In some embodiments, when a line is written to a cache, a "compression" bit may be set to indicate whether the line is compressed. For example, a cache line may include a "1" to indicate that the line is compressed, while a second cache line may include a "0" to indicate that the second line is not compressed. In some instances, when a cache line is read, such an indicator may be checked to determine whether the cache line is compressed. However, checking this indicator bit directly may be relatively time-intensive; by the time the result is known, the core may already have had to decide whether to decompress the line or not. In other words, such a lookup may not provide any benefit in some use cases. Instead, in some instances, the predictor may utilize additional indicators to mark portions of a cache as compressed.

For example, many caches are organized into "congruence classes" (CCs), where a CC contains one or more lines. The number of lines included in a CC depends on the "way-ness" of the cache; for example, an 8-way cache can have CCs of 8 lines, etc. In some instances, a system consistent with the present disclosure may utilize an indicator for each CC of a cache. If any line of the CC is determined to be compressed, the entire CC may be marked (via setting a value of the indicator) as compressed. This can be accomplished, for example, by taking an "OR" operation of all of the cache line indicator bits.

In operation, a CC may initially be empty, with an indicator that has not been set. For example, the indicator may have a default value of "0," indicating that the CC is not compressed. As the CC gets populated (i.e., as lines are cached), if any line is compressed, the indicator may be set to "1," indicating that the CC includes a compressed line. Thus, when lines are read, the indicator of their corresponding CC can be checked; if the value is "1," then at least one line in the CC is compressed. In some instances, this may be sufficient cause to consider the entire CC compressed, meaning that a line being read from that CC may be flagged for decompression, even if the line being read is not actually compressed.

In some instances, once set, the indicator may remain set to "1" until the cache is cleared (at which point it may be reset to "0"). However, this may mean that, over time, all lines may eventually be assumed to be compressed. In some instances, the predictor may track which lines in a particular CC were compressed, enabling the predictor to reset the indicator to "0" once all compressed lines in a given CC have been evicted.

In some instances, rather than utilize a predictor, a system may essentially assume all cache lines are compressed at all times. While this may result in always paying a decompression penalty (even when it may have otherwise been unnecessary), the complexity of the system may be reduced. Thus, in instances where a decompression penalty is particularly small, assuming all lines are compressed may be relatively valuable in terms of return on investment.

In some instances, compressing the "wrong" cache lines can be not only less useful, but actually counterproductive. For example, reading a line from an L3 cache may take 18 cycles, while reading the same line from RAM may take 10 times longer (i.e., 180 cycles), though decompressing a line may take 4 cycles. Thus, if compressing a first line of a cache saves enough room to store a second line in the same cache, then when the second line is needed, reading it from the cache rather than accessing RAM can save several cycles. In this example, the savings can be up to 180−18=162 cycles, assuming the second line is not compressed; if the second line is also compressed, the savings are still a substantial 180−18−4=158 cycles. However, decompressing the first line may also require 4 additional cycles. In this example, if the first line is read 50 times as often as the second line, then on average, every time the second line is read (saving up to 162 cycles), the first line may have been read and decompressed 50 times. In each of those 50 reads, the system would have suffered a decompression penalty of 4 cycles (costing 50*4 cycles=200 cycles). Therefore, in this example, compressing the first cache line in order to cache the second line actually results in worse performance on average; up to 162 cycle savings−200 cycle cost=−38 (i.e., 38 cycles overall added latency).

Caches typically track contents using a system of tags and addresses. In essence, data in memory has a memory address and a unique identifier called a "tag." When the data is stored in a cache, the tag may be stored with the data, and the memory address may be recorded in a "set index," indicating where in the cache the data can be found. Thus, when checking a cache to determine whether the data is in the cache, the address is checked against the set index. In some instances, this set index may also indicate whether the data is in a compressed state or not.

FIG. 1 is a diagram of an example predictive/adaptive cache compression system 100, consistent with several embodiments of the present disclosure. System 100 includes cache manager 102, L1 cache 110, L2 cache 120, and central processing unit (CPU) core 108. Core 108 is configured to communicate with cache manager 102 in order to request cached lines from caches such as L1 cache 110 and/or L2 cache 120.

Cache manager 102 includes compression predictor 104 and adaptive compressor 106, both of which are described in further detail below. However, a brief example is provided to introduce cache manager 102's general functionality. Core 108 may be executing an application, and the application may require certain data. In such an instance, Core 108 may send a request for the required data to cache manager 102, which may in turn check whether the data is cached in L1 cache 110. If the data is contained in L1 cache 110 (an L1 "cache hit"), cache manager 102 may retrieve the data from the L1 cache and send it to Core 108. If instead the data is not contained in L1 cache 110 (an L1 "cache miss"), cache manager 102 may check whether the data is cached in L2 cache 120. If the data is not in L2 cache 120 either (an L2 cache miss), cache manager 102 may need to check a higher-level cache such as an L3 cache (not shown in FIG. 1) or else send the request to a memory manager (not shown in FIG. 1).

As discussed above, modern caches may utilize compression to save space, enabling caches to store more lines than they might otherwise be able to. In order to further improve cache compression systems, the present disclosure improves upon the art by introducing additional logic to cache manager 102 in the form of compression predictor 104 and adaptive compressor 106.

As an overview, compression predictor 104 enables predicting whether a cache line being read is uncompressed or not, and adaptive compressor 106 enables more efficiently selective compression of lines being written to various caches. While both components can function independently of one another, it can be particularly advantageous to utilize both.

Compression predictor 104 is configured to predict whether incoming cache lines are uncompressed or not, and therefore to enable Core 108 to adjust as needed to the compression (or lack thereof). This can be accomplished in a number of ways. For example, in some instances, addresses of uncompressed lines can be stored in predictor 104 (such as in dedicated predictor storage, not shown in FIG. 1). This can enable tracking which lines are compressed/uncompressed, as a line that is not known to be uncompressed may be assumed to be compressed. In such an instance, when a line is read from L2 cache 120, compression predictor 104 can check its storage to determine whether the line is not compressed or not.

In order to track which lines are compressed/uncompressed, predictor 104 may be capable of determining whether a line is compressed or not. This can be accomplished simply by periodically checking "line bits" of each cache line, which may indicate whether the associated line is compressed or not. However, this can be resource-intensive, so other methods are also considered. For example, lines are typically (or, in some instances, always) uncompressed when they are written to the L2 cache 120, as they are often written to the L2 cache 120 upon being evicted from the L1 cache 110 (and lines in L1 cache 110 may rarely be compressed). Thus, in some instances, predictor 104 may assume that every line written to L2 cache 120 is, at least initially, uncompressed. This assumption may sometimes be incorrect, so this may be preferable in instances where it is more likely to be true or where the penalty for an incorrect assumption is relatively low (or both). In some instances, predictor 104 may communicate with adaptive compressor 106 to detect when lines are compressed.

In some instances, compression predictor 104 can be configured to track compression on a lower resolution than line-by-line tracking discussed above. For example, in some instances, compression predictor 104 can monitor compressed lines on a congruence-class basis. This may enable compression predictor 104 to require less storage, but may also result in greater mispredictions. For example, in some embodiments, compression predictor 104 may be configured to periodically determine whether any lines within each congruence class are compressed. Further, compression predictor 104 may set a "class bit" for each congruence class to indicate whether the corresponding congruence class includes any compressed lines. Then, in operation, upon receiving a cache line to be sent to Core 108, compression predictor 104 may check the congruence class of the cache line, and check the corresponding class bit to predict whether the cache line is compressed or not.

In some instances, predictor 104 may store a number of lines that are compressed. This may be less resource-intensive than tracking whether each line is compressed, with a tradeoff of reduced prediction accuracy. For example, if 6,000 lines out of 8,000 lines stored in a cache are compressed, storing the value "6,000" requires significantly less overhead than storing 6,000 line addresses. However, whenever a given line is read, predictor 104 may be unable to determine exactly whether the line is compressed or not. Instead, in such a situation, predictor 104 may estimate a likelihood that the line is compressed. Continuing with the "6,000 of 8,000" example, a simple implementation of predictor 104 may estimate a likelihood of any given cache line being compressed as 6000/8000=3/4=75%. This likelihood can then be compared to a threshold in order to determine whether to treat the line as compressed (i.e., in order to decide whether to warn CPU core 108 that the line it requested is compressed).

This threshold can be based on the severity of the penalty of an incorrect prediction. For example, a "false negative" (i.e., treating the line as uncompressed when it is actually compressed) may result in a penalty ten times worse than a "false positive" (i.e., treating the line as compressed when it is actually uncompressed). In such an example, predictor 104 may be configured to weight, or bias, a prediction in favor of assuming the line is compressed, unless the likelihood is overwhelmingly in favor of the line being uncompressed. For example, given a 15% likelihood the line is compressed, predictor 104 may still assume the line is compressed, due to the significant penalty of a false negative. As an additional example, a 5% likelihood the line is compressed may be sufficiently low for predictor 104 to treat the line as uncompressed.

In some instances, predictor 104 may track whether a most recently used (MRU) line is compressed or not. Because more recently used lines are (generally) more likely to be read, an MRU line being compressed may inherently indicate that a given line being read is compressed (due to the likelihood that the line being read is the MRU line). Similarly, predictor 104 may track a compression state of a given group of the most recently used lines. For example, predictor 104 may track whether the five most recently used lines are compressed or uncompressed (on a line-by-line basis), but utilize congruence-class-based tracking for the rest of the cache. This may advantageously yield some of the benefits of line-by-line tracking with some of the resource conservation of CC-based tracking.

Adaptive compressor 106 and its functionality is described in further detail below with reference to FIGS. 6A-10, but as a brief overview, adaptive compressor 106 is configured to receive data to be written to a cache and determine whether the data should be compressed. Compression can be enabled or disabled based on, for example, comparing simulated performance of a compressed cache with simulated performance of an uncompressed cache. Adaptive compressor 106 can also (or alternatively) determine whether to compress individual cache lines on a line-by-line basis based on factors such as each line's position within a most-recently-used (MRU) stack.

Figure 2:
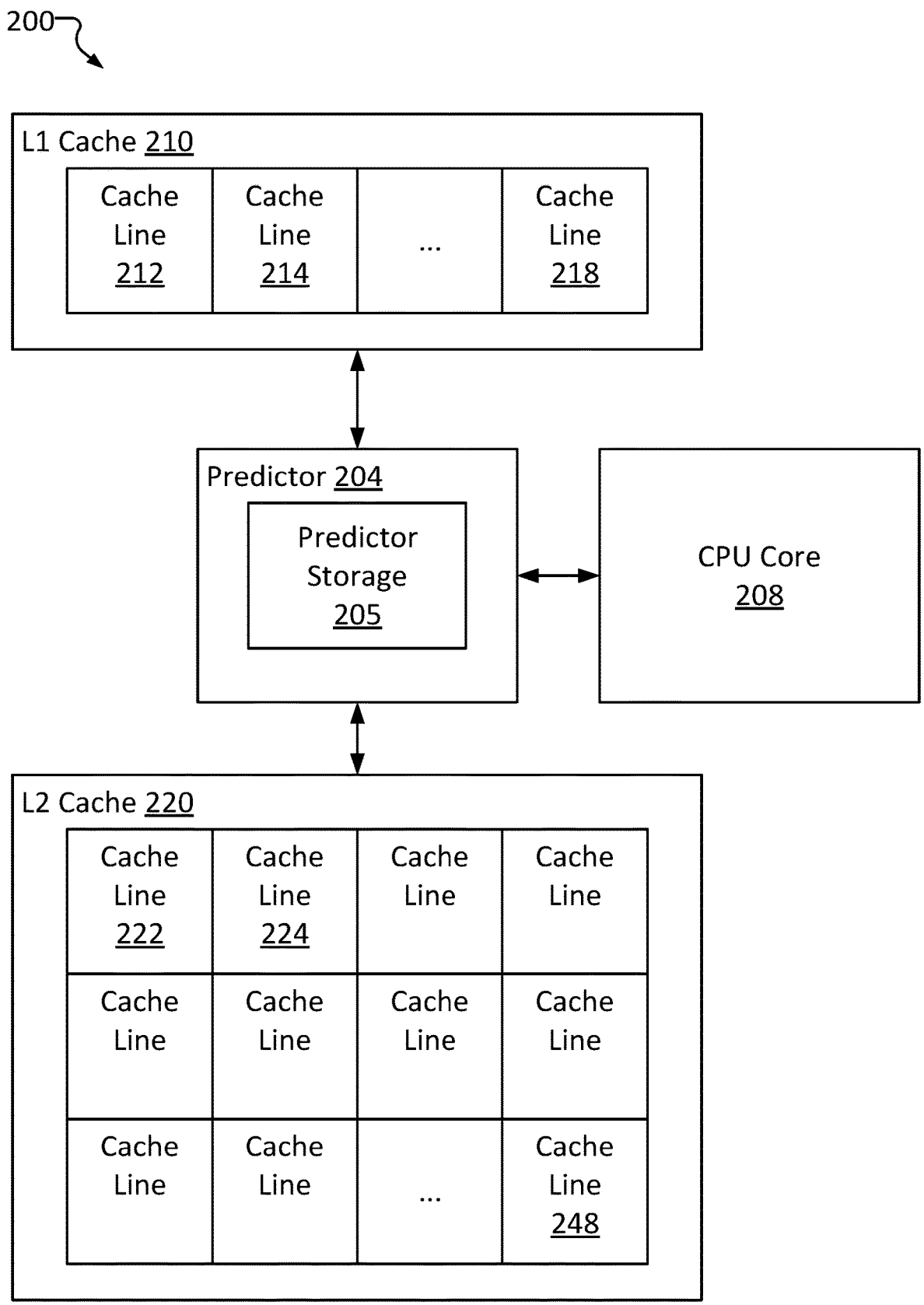
FIG. 2 is a diagram of a cache compression system including a more detailed view of a compression predictor (including predictor storage), as well as an L1 cache and an L2 cache, consistent with several embodiments of the present disclosure.

FIG. 2 is a diagram of a cache compression system 200 including a more detailed view of a compression predictor 204 (including predictor storage 205), as well as an L1 cache 210 and an L2 cache 220, consistent with several embodiments of the present disclosure. For example, L1 cache 210 includes cache lines 212, 214, and 218, while L2 cache 220 includes cache lines such as 222, 224, and 248. As with typical cache systems, some lines may be present in both caches. As a brief example, a CPU core 208 may request data from L1 cache 210 (via a cache manager not depicted in FIG. 2), resulting in a cache miss, meaning the L2 cache 220 may be checked, resulting in a cache hit. In the example, the requested data may be in cache line 224. As a result, cache line 224 may be returned to core 208, and cache line 224 may be written to L1 cache 210 as cache line 212.

In particular, predictor 204 can be configured to store indicator bits in storage 205 which can, in turn, indicate whether cache lines such as cache line 212, 214, etc., are compressed. In some instances, predictor 204 may update the indicators whenever a line is written to either cache 210 or cache 220.

As an example, cache line 222 may be a compressed cache line including a first data portion, while cache line 224 may be an uncompressed cache line including a second data portion. Predictor storage 205 may therefore include data indicating that line 222 is compressed and line 224 is uncompressed. CPU 208 may request the first portion of data, which may be absent from L1 cache 210, resulting in the data being read from L2 cache 220 (specifically, cache line 222 may be returned). As cache line 222 is returned from L2 cache 220, predictor 204 may check predictor storage 205 to determine whether cache line 222 is compressed. As noted, predictor storage 205 may include an indicator describing cache line 222 as a compressed cache line. Therefore, as cache line 222 is returned to CPU 208, predictor 204 may also transmit a signal to CPU 208 indicating that line 222 is compressed, allowing CPU 208 to prepare for decompression accordingly (e.g., by adjusting scheduled executions per return data being delayed for decompression, etc.).

In some instances, predictor storage 205 may not include indication of any compressed cache lines (only tracking uncompressed cache lines). In such an implementation, as cache line 222 is returned from L2 cache 220, predictor 204 may determine that predictor storage 205 lacks any indication that cache line 222 is uncompressed. As a result, predictor 204 may assume that cache line 222 is compressed.

In addition, once uncompressed, cache line 222 may be written to L1 cache 210 as part of normal caching operations. The uncompressed line may be written as cache line 212. Predictor 204 may therefore update predictor storage 205 to indicate that cache line 212 is uncompressed. In some instances, L1 cache 210 may be fully uncompressed, in which case predictor 204 may not need to predict whether any of lines 212-218 are compressed, so predictor 204 may not need to indicate that line 212 is uncompressed.

In contrast, CPU 208 may later request the second portion of data (i.e., that stored in an uncompressed state in cache line 224, although CPU 208 is "unaware" of this at the time of the request). Assuming that the second portion of data is not in L1 cache 210, cache line 224 may be returned to CPU 208. As this is occurring, predictor 204 may again check predictor storage 205 to predict whether cache line 224 is compressed or not. Upon determining that cache line 224 is uncompressed, predictor 204 may send a signal to CPU 208 indicating that the incoming cache line is uncompressed. In some instances, predictor 204 may take no action rather than transmitting an "uncompressed" signal; for example, CPU 208 may be configured to assume every line is compressed unless predictor 204 informs it otherwise.

In some instances, predictor 204 may track types of lines stored in cache 210 and/or 220. In particular, predictor storage 205 may indicate whether a given line is an instruction ("I") line or a data ("D") line. This can be useful as some cache setups may maintain separate caches such as an instruction cache ("I-cache") and a data cache ("D-cache"). Notably, I lines may be generally incompressible. As a result, even if both line types are "comingled" in the same cache, it may still be useful for predictor 204 to track line types. For example, I lines may be assumed to be uncompressed.

Further, in some instances where predictor 204 tracks line types, system 200 may utilize predictor 204's tracking of line types to aid in eviction decisions. For example, given data (D) and instruction (I) lines in the cache, there may be relatively more D lines than I lines. This can be due to D lines being more common in general. As a result, the more recently used (MRU) lines of the cache may be more likely to be D lines, and thus a given I line may be more likely to be closer to the least recently used (LRU) position of the cache. However, this example I line may still be the MRU I line (i.e., it may be the MRU with respect to other I lines). For example, predictor 204 may track 256 KB of the most recently used of I content. The example I line may remain the most recent of this 256 KB even if all of the D traffic causes the I line to become LRU in the cache proper. However, in such an instance, even though the example I line is in the LRU position, system 200 may opt not to evict it as it is still the most likely I line to be used again.

Figure 3:
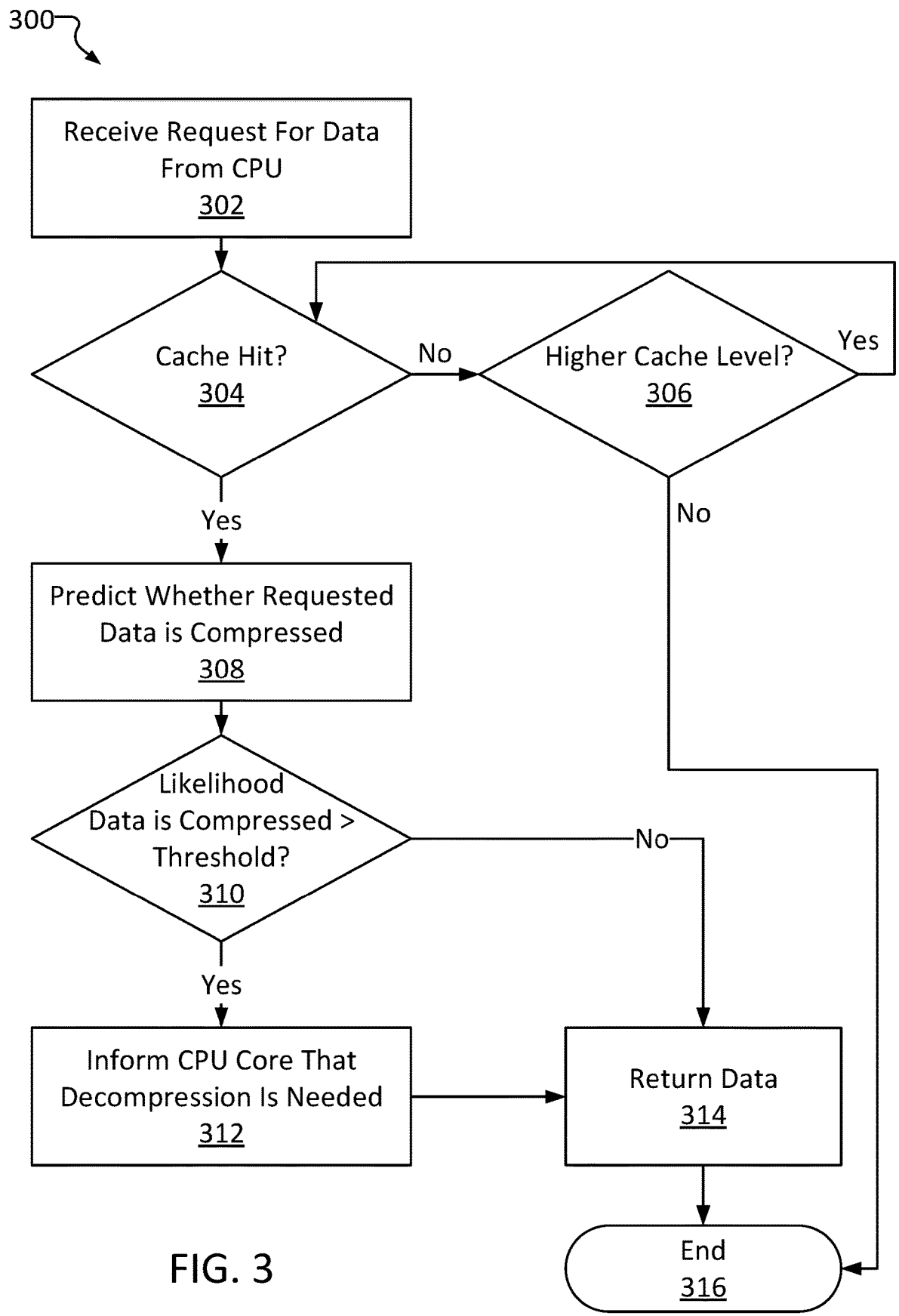
FIG. 3 is a flow diagram of a cache line compression prediction method, consistent with several embodiments of the present disclosure.

FIG. 3 is a flow diagram of a cache line compression prediction method 300, consistent with several embodiments of the present disclosure. Method 300 comprises receiving a request for data from a central processing unit (CPU) at operation 302. Operation 302 may be performed by a cache manager such as, for example, cache manager 102 of system 100, described above with reference to FIG. 1.

Method 300 further comprises determining whether the request results in a cache hit at operation 304. Operation 304 may be performed in a manner consistent with typical caching systems (i.e., a cache manager may check whether the requested data is in the cache). If the data is not in the cache (304 "No"), method 300 further comprises checking whether a higher level cache exists at operation 306. For example, if operation 304 is performed on an L1 cache, operation 306 may include checking whether the system performing method 300 includes an L2 cache. If the highest-level cache has been checked (306 "No"), operation 306 may include sending the request to memory, meaning cache compression prediction is no longer necessary (i.e., method 300 may end at 316). If there is a higher-level cache left to check (306 "Yes"), method 300 returns to check whether the data is stored in that higher level cache via another iteration of operation 304.

If the data requested at operation 302 is in the cache (304 "Yes"), method 300 further comprises predicting whether the requested data is compressed at operation 308. Operation 308 may include, for example, evaluating a likelihood that the cache line containing the requested data is compressed. This likelihood can be based on, for example, stored indicators describing a state of lines in the cache, a state of a congruence class including the requested line, etc. In some instances, the likelihood may effectively be certain (i.e., 100% or 0%). For example, the predictor may directly track whether each line is compressed or uncompressed, in which case operation 308 may simply include checking whether the line in question is compressed.

However, in many instances, the predictor may utilize less-deterministic methods in order to conserve resources and improve execution speeds. For example, the predictor may track an overall number of uncompressed lines. As additional examples, the predictor may track whether any of the five most recently used lines (i.e., whether any of the top five lines of the MRU stack) are compressed, or how many of the top ten MRU lines are compressed, or what the position of the MRU compressed line is, etc. Some or all of these methods can also be used in combination with one another to enhance accuracy while still remaining less resource-intensive than directly tracking each line. Operation 308 may vary depending upon the method(s) of tracking implemented.

As one example, the predictor may track a total number of compressed lines, a total number of lines in the cache, and a number of the five MRU lines that are compressed. For instance, the predictor may store information indicating that 2,000 lines are compressed, the cache includes 10,000 lines, and 3 of the 5 MRU lines are compressed. In such an example, operation 308 may include calculating a first ratio of the total number of compressed lines to the total number of lines in the cache (2000/10000=1/5=0.2) and a second ratio of the number of the five MRU lines that are compressed (3/5=0.6), and then calculating the arithmetic mean of the two ratios ((0.2+0.6)/2=0.8/2=0.4), using the final result as the likelihood (0.4, or 40%).

As another example, the predictor may only track the position in the MRU stack of the most recently used line that is compressed. In such an example, operation 308 may include calculating $0.8^n$, where n is the tracked position. For instance, the MRU line (position 1) may be uncompressed, the second MRU (position 2) may also be uncompressed, but the third MRU (position 3) may be compressed. Thus, the predictor might store the number n=3 to indicate that the first compressed line is the third MRU line. As a result, operation 308 may include calculating $0.8^3$=0.512, resulting in a likelihood of 51.2%. The above examples are presented as illustrative examples only; different weights and techniques can be utilized instead, as understood by those of skill in the art.

In some instances, the predictor may track compressed lines via virtual addresses, rather than physical addresses. This can allow the predictor to function without waiting for address translations, improving prediction times. However, due to the nature of virtual addresses (when compared to actual, physical addresses), this can cause some aliasing, which can in turn introduce error to the prediction.

Method 300 further comprises determining whether the predicted likelihood that the data is compressed is above a prediction threshold at operation 310. Operation 310 may include, for example, comparing the likelihood determined via operation 308 to a preset threshold. In some instances, operation 308 may be an absolute determination, in which case operations 308 and 310 may functionally be combined into a single operation. For example, a compression predictor may track compressed cache lines on a line-by-line basis, in which case the "prediction" as to whether the cache line is compressed may comprise checking the identifier stored in predictor storage. In contrast, in embodiments wherein compression is tracked on a more general basis (e.g., where the predictor merely tracks a total number of compressed lines in the entire cache, or how many of the MRU lines are compressed, etc.), the prediction of operation 308 may only provide a degree of confidence.

If the compression likelihood is above the prediction threshold (310 "Yes"), method 300 further comprises informing the CPU that decompression is necessary at operation 312. Operation 312 may include, for example, transmitting a signal to the CPU indicating that the data about to be returned to the CPU is in a compressed state. Method 300 then further comprises returning the data to the CPU at operation 314.

If the compression likelihood is below the prediction threshold (310 "No"), method 300 may proceed directly to operation 314, without necessarily informing the CPU of the uncompressed state of the data. In some instances, the CPU may be configured to assume all cache lines are compressed, in which case, operation 310 may effectively be skipped (or always assumed to be "Yes"). Instead, method 300 may proceed from operation 308 to informing the CPU that the cache line is compressed at operation 312. In some instances, the CPU may be configured to assume all cache lines are uncompressed, in which case operation 310 may similarly be skipped (or always assumed to be "No"). Regardless of whether the CPU must be informed, method 300 then proceeds to returning the data to the CPU at operation 314. Method 300 then ends at 316.

Figure 4:
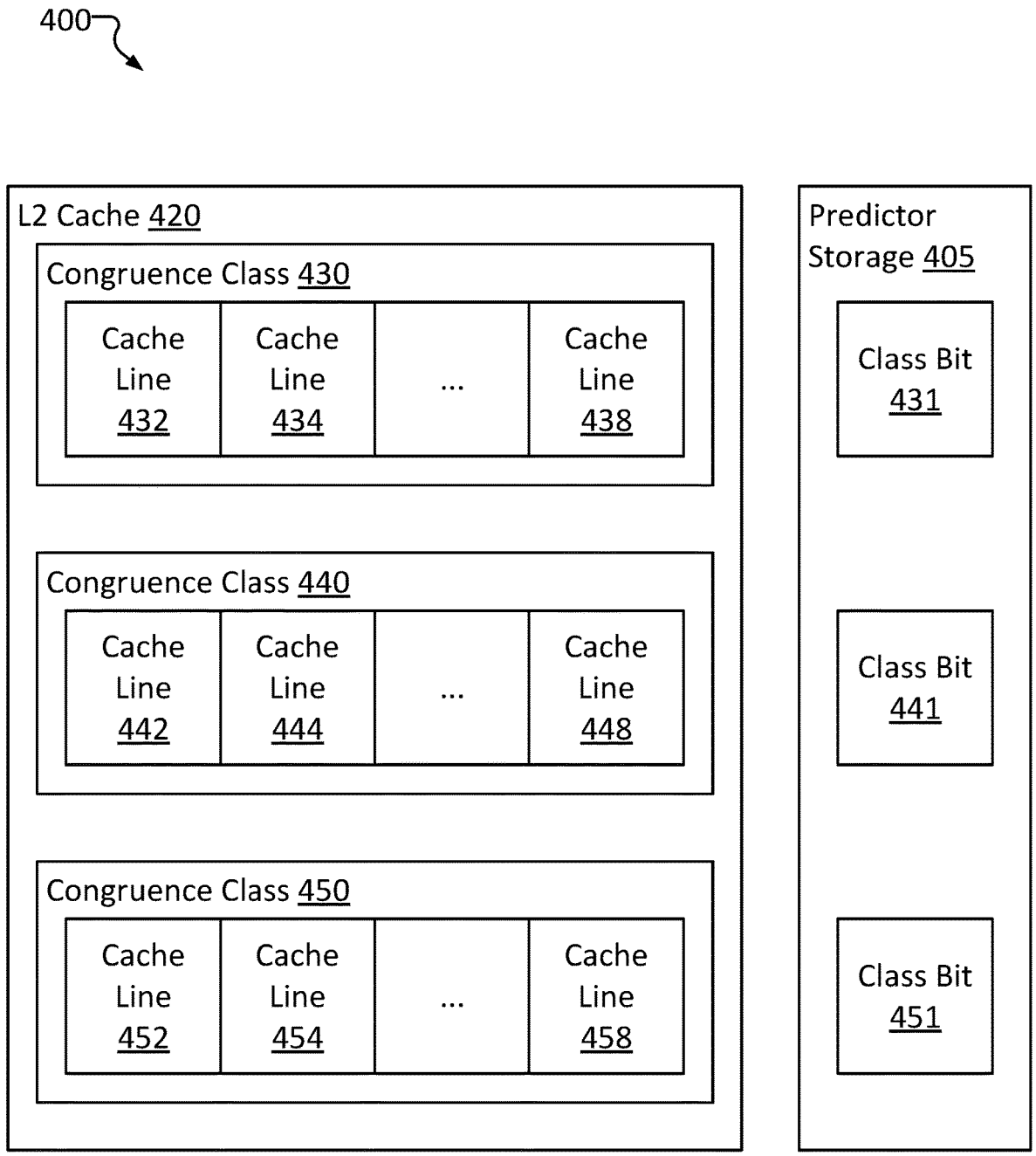
FIG. 4 is a diagram of a congruence-class-based compression predictor system, consistent with several embodiments of the present disclosure.
Figure 5:
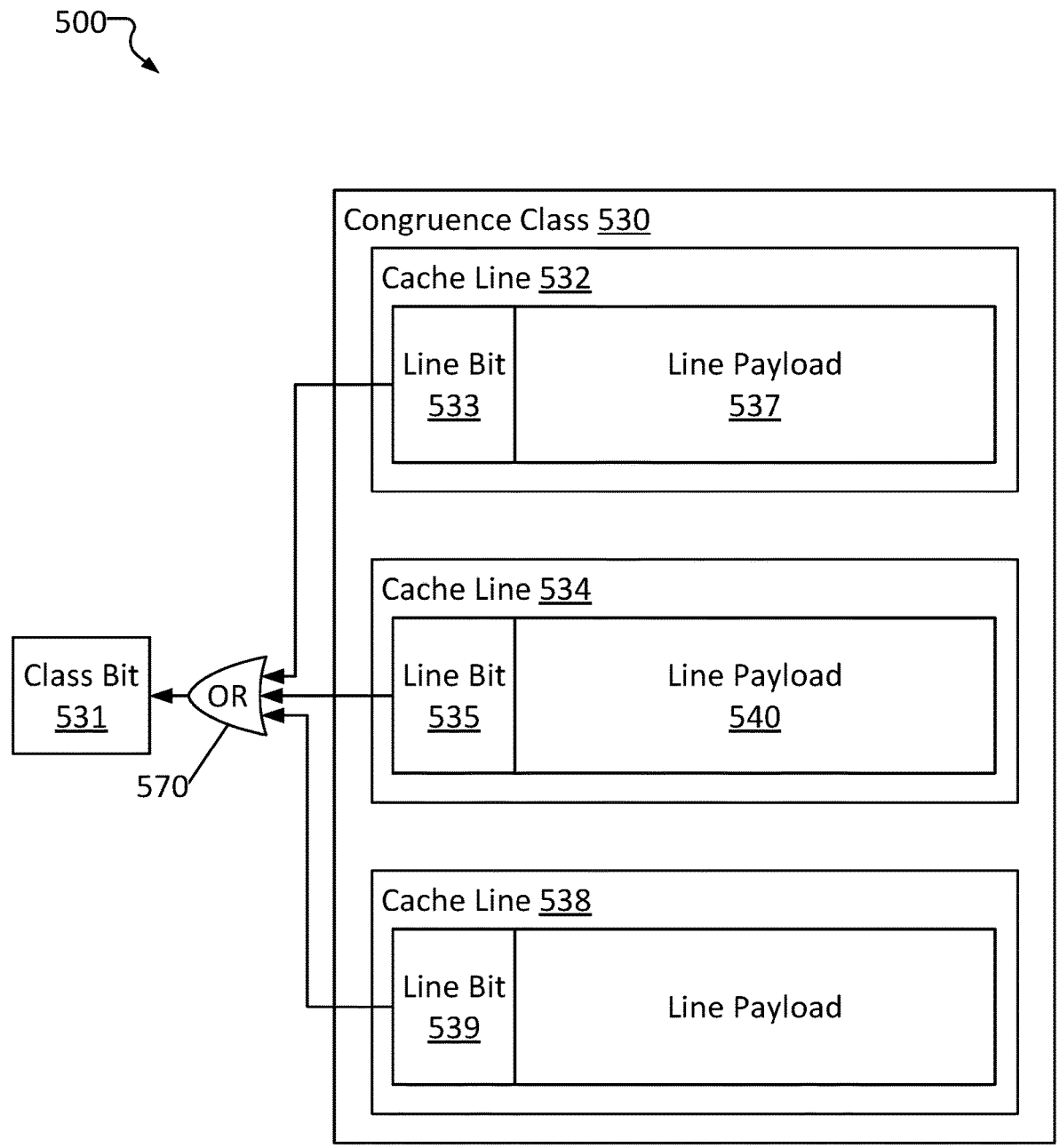
FIG. 5 is a diagram of an example compression predictor system, consistent with several embodiments of the present disclosure.

FIG. 4 is a diagram of a congruence-class-based compression predictor system 400, consistent with several embodiments of the present disclosure. L2 Cache 420 includes multiple cache lines, organized in FIG. 4 into congruence classes (CCs) such as CC 430, CC 440, and CC 450. Predictor storage 405 includes class bits such as class bit 431, class bit 441, and class bit 451. Each class bit can be set to indicate whether any of the cache lines within a corresponding CC are compressed. For example, if cache lines 432 and 438 are uncompressed but cache line 434 is compressed, class bit 431 may be set to "1." As another example, if all of cache lines 442, 444, and 448 are compressed, class bit 441 may be set to "1." As an additional example, if all of cache lines 452, 454, and 458 are uncompressed, class bit 451 may be set to FIG. 5 is a diagram of an example compression predictor system 500, consistent with several embodiments of the present disclosure. System 500 includes a single congruence class 530, represented by a class bit 531. CC 530 includes cache lines 532, 534, and 538. CC 530 could include additional cache lines, but they are omitted from FIG. 5 for brevity.

Each cache line may include a "line payload," which includes the actual data being stored in the line, and a "line bit," which indicates whether the line payload is compressed. For example, cache line 532 includes line bit 533, which indicates whether line payload 537 is compressed. As an illustrative example, if line payload 537 is compressed, line bit 533 may be "1," while if line payload 537 is uncompressed, line bit 533 may be "0."

Data stored in cache payloads can be compressed according to different methodologies, and successful decompression of a compressed payload generally requires knowledge of the type of compression. For example, line payload 537 may be compressed via a first compression method, while line payload 540 may be compressed via a second, different compression method. In such an example, attempting to decompress line payloads 537 and 540 with the same decompression algorithm may be unsuccessful for at least one of the two payloads. Encryption can also serve as a comparison; attempting to decompress data with the "wrong" decompression method can be analogous to decrypting encrypted data with the "wrong" key.

Thus, in some instances, the line bits may actually include several bits, in order to represent additional data such as compression type. For example, rather than being a single "1" to mean "compressed" and "0" to mean "uncompressed," line bit 533 may utilize two bits to support values such as "11" to mean "compressed via first compression method," "10" to mean "compressed via second compression type," "01" to mean "compressed via third compression type," or "00" to mean "uncompressed."

Line bits could be used to determine whether cache lines are compressed. For example, upon a cache hit for cache line 532, a system might check line bit 533 to determine whether line payload 537 is compressed. However, this approach can be costly, resulting in delays in processing payload 537 while the prior art system waits to determine whether the payload is compressed. In contrast, the present disclosure enables determining whether a payload (such as line payload 537) is compressed as the payload is being retrieved/returned to the processor. This can be achieved by storing information regarding whether the payload is compressed (such as, for example, class bit 531) in a predictor's storage. The predictor may be able to access its own storage significantly faster than checking a line bit of a cache. For example, the predictor's storage may be small enough to be positioned relatively close (in terms of a chip floorplan). Further, the predictor may utilize a cache line's virtual address, which can be faster than going through the typical translation process (with a tradeoff of introducing some possible errors). This way, a system can check whether the payload is compressed before the payload itself is sent to the processor, providing the processor with advance notice regarding the state of the payload.

In order to set class bit 531, system 500 may periodically check line bits 533, 535, and 539 to determine whether any of cache lines 532, 534, and 538 are compressed. In the example depicted in FIG. 5, this is performed via an "OR" circuit 570, meaning if any of cache lines 532, 534, and 538 are compressed, class bit 531 will be set to "1." This means that, in practice, all lines of congruence class 530 are treated as compressed so long as any lines of CC 530 are compressed. Other approaches are also considered, as described in further detail below. Circuit 570 may be included within a predictor, or may be its own external component. In some instances, different or additional circuits 570 may be utilized.

Once class bit 531 is set, then whenever a cache hit includes a cache line included within CC 530, class bit 531 is checked to determine whether the relevant cache line is to be treated as compressed. If class bit 531 were in predictor storage, checking class bit 531 may be significantly faster than checking any of line bits 533, 535, and 539, and thus the processor can be made aware of the state of the line payload with reduced delay.

Figure 7:
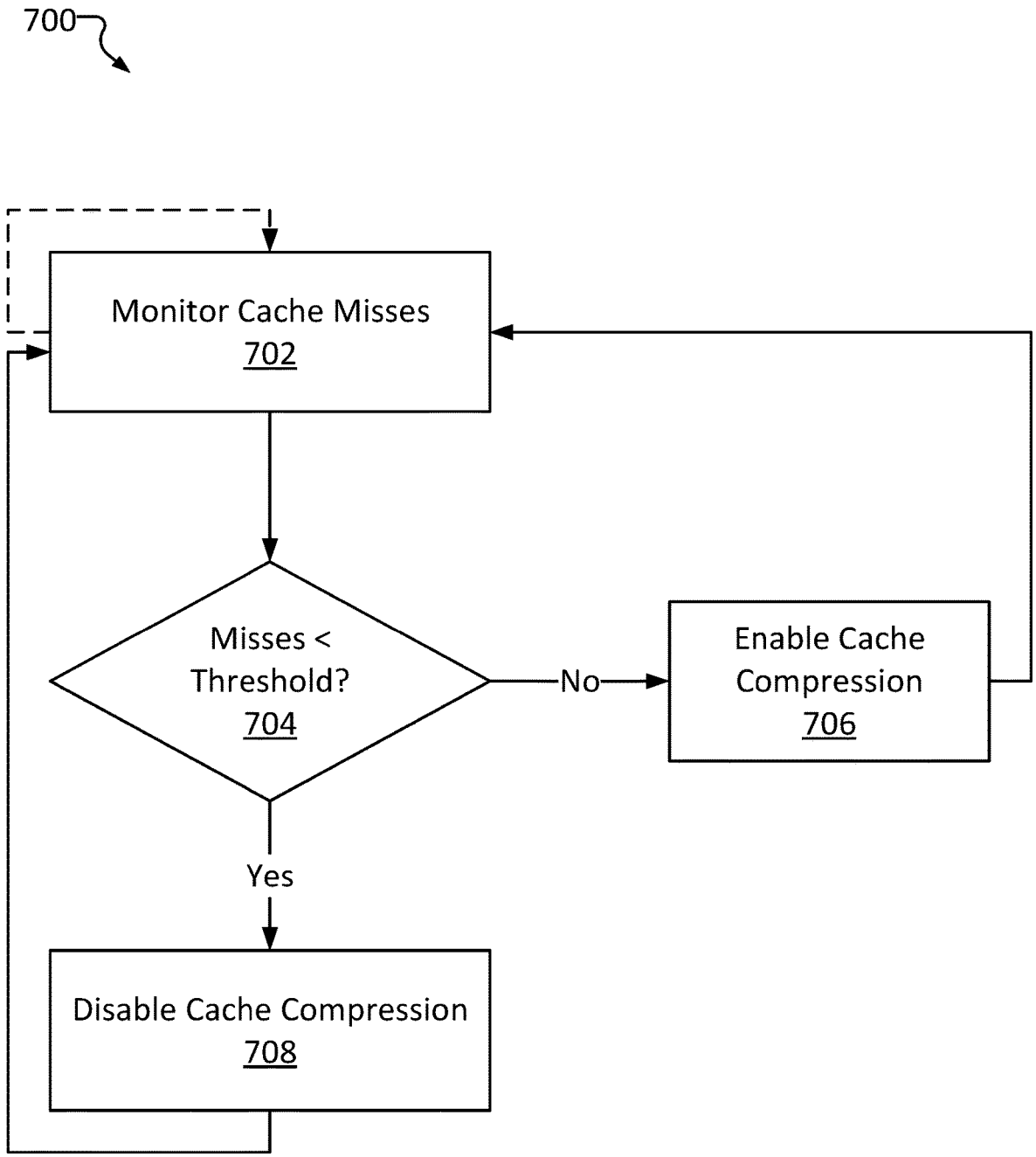
FIG. 7 is a flowchart of a simple method for dynamically adjusting cache compression, consistent with several embodiments of the present disclosure.
Figure 8:
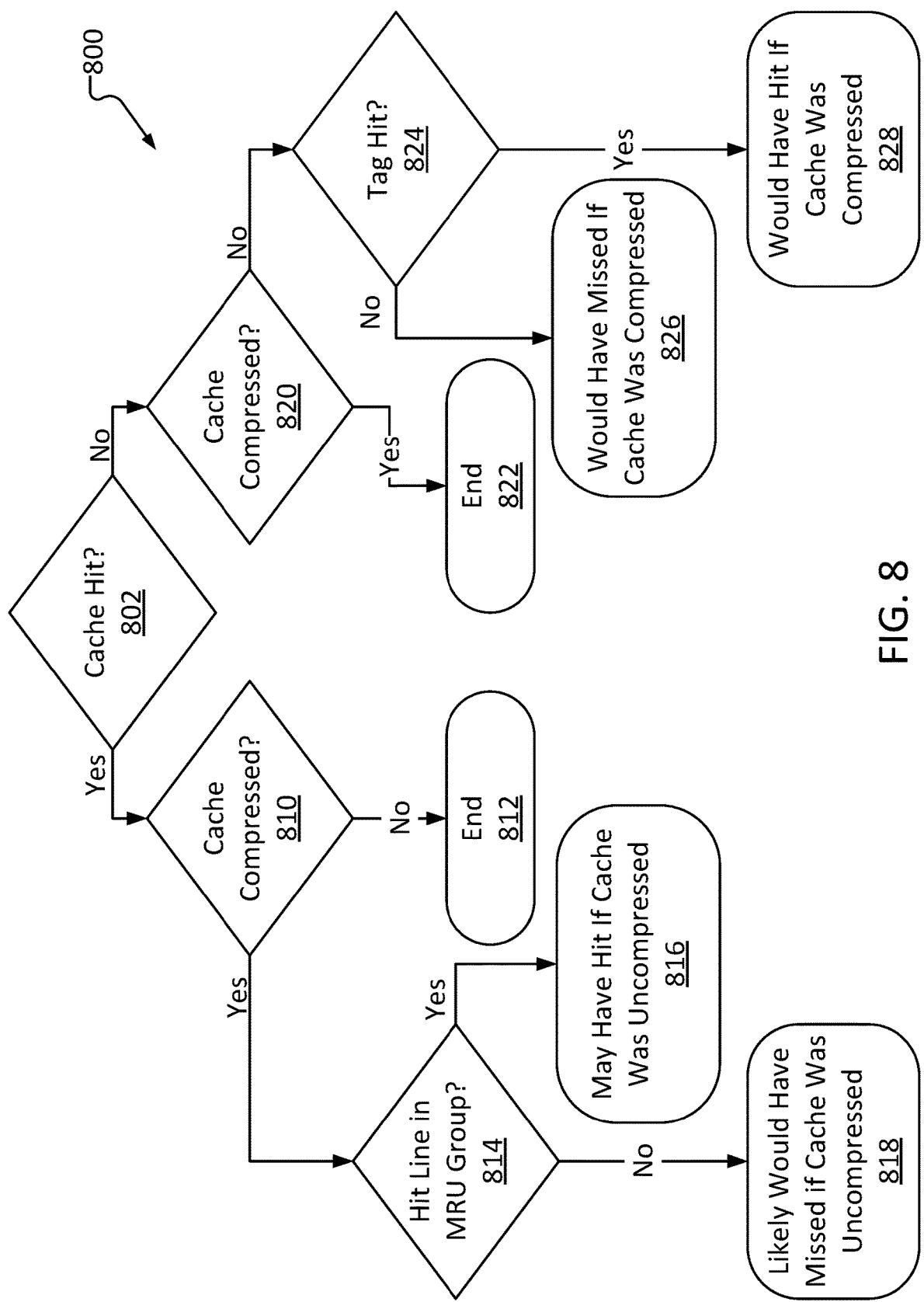
FIG. 8 is a flowchart of a method of simulating cache miss rates for compressed and uncompressed caches, consistent with several embodiments of the present disclosure.
Figure 9:
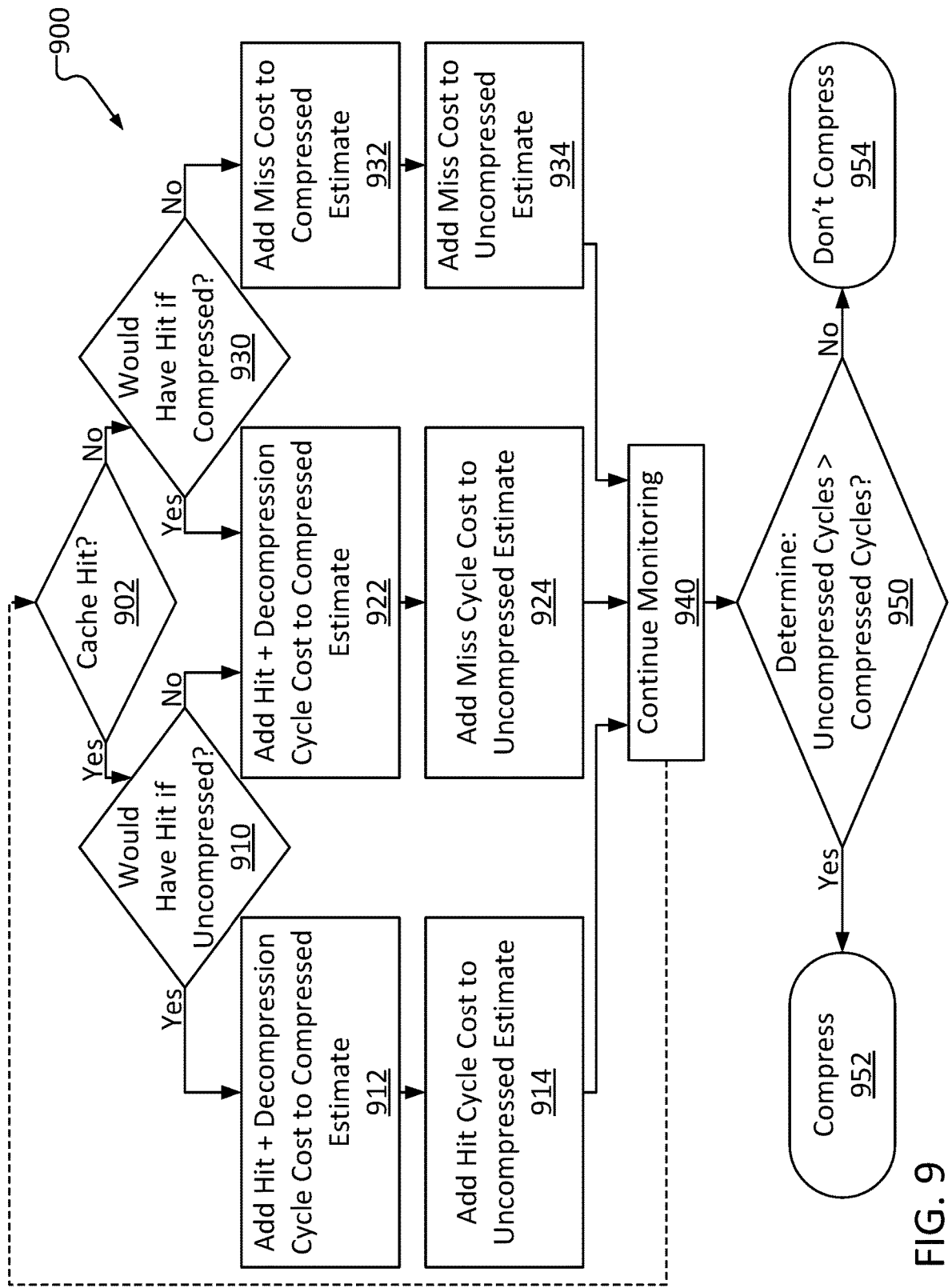
FIG. 9 is a flowchart of a method of adaptive cache compression based on simulated miss rates, consistent with several embodiments of the present disclosure.

In addition to the compression predictor discussed above, the present disclosure also enables adaptive cache compression (i.e., deciding when to compress and when not to compress cache lines). FIGS. 7-9 describe several approaches to controlling cache compression.

Figure 6A:
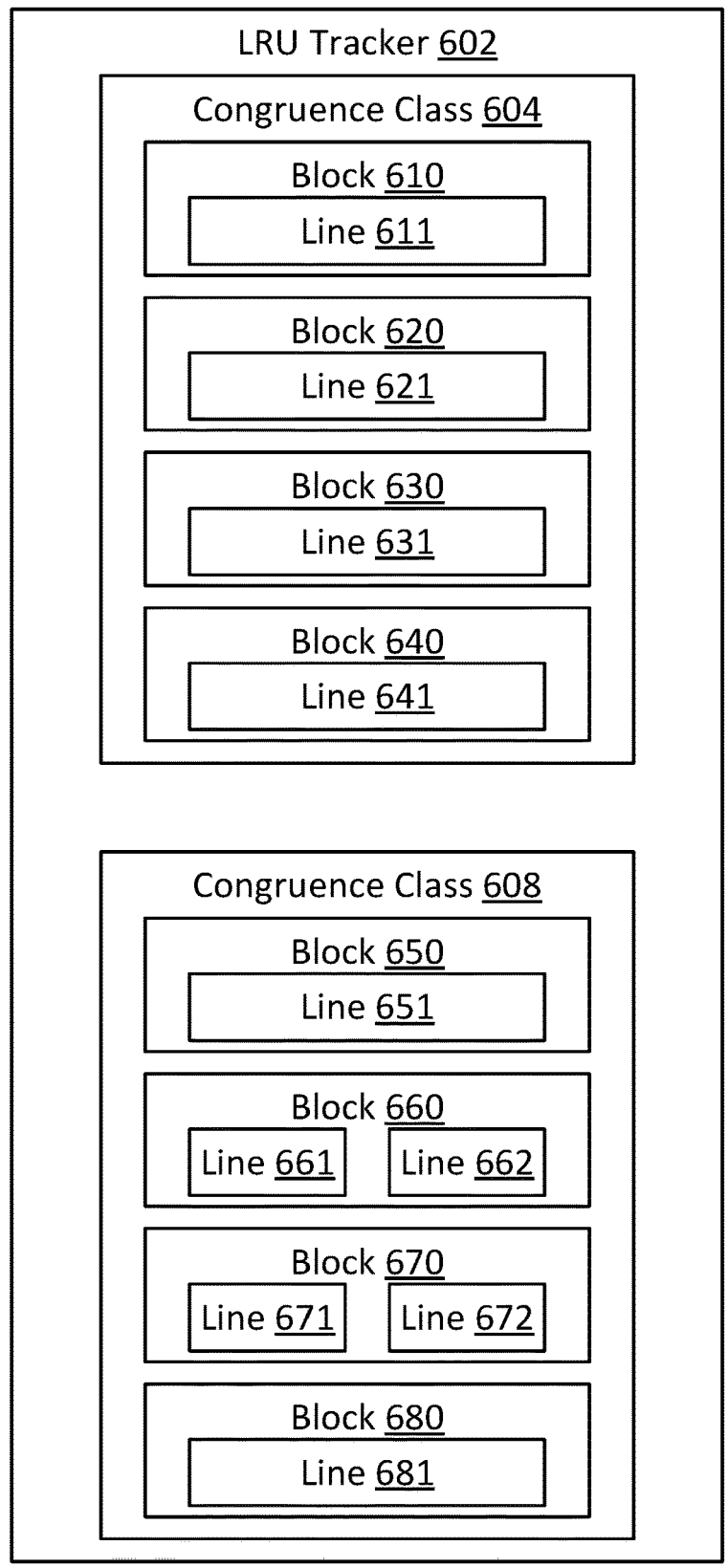
FIG. 6A is a diagram of an example least recently used (LRU) tracker, consistent with several embodiments of the present disclosure.

FIG. 6A is a diagram 600 of an example least recently used (LRU) tracker 602, consistent with several embodiments of the present disclosure. LRU tracker 602 may be utilized by an adaptive cache, in accordance with embodiments. LRU tracker 602 includes multiple congruence classes 604, 608, and each congruence class in turn contains several blocks, which contain cache lines. For example, congruence class 604, as shown in FIG. 6, includes three blocks: block 610, block 620, and block 630. Each of blocks 610-630 includes a single (uncompressed) cache line; block 610 includes uncompressed line 611, block 620 includes uncompressed line 621, and block 630 includes uncompressed line 631. Similarly, congruence class 608 includes blocks 650, 660, 670, and 680. While block 650 includes line 651 and block 680 includes line 681, blocks 660 and 670 notably include multiple cache lines. For example, block 660 includes two compressed lines, 661 and 662, and block 670 similarly includes compressed lines 671 and 672.

Notably, LRU tracker 602 may not track an LRU position of lines 611-681 directly, or even on a block-by-block basis. Instead, a cache utilizing LRU tracker 602 may track an LRU position of congruence classes 604 and 608. Whenever a cache line is read, the congruence class it is within may be moved to the bottom of LRU tracker 602. Thus, LRU tracker 602 essentially lists congruence classes arranged according to which congruence class contains the least recently used line. Many cache "eviction policies" are configured to evict the LRU cache line if possible when space is needed to write a new line to the cache, as the LRU line is often considered to also be the least likely to be needed again in the near future. In some instances, a most recently used (MRU) tracker may be implemented instead of LRU tracker 602. An MRU tracker generally would not need to track every line of the cache (though they still can, if desired). For purposes of FIG. 6A-6B, LRU tracker 602 is assumed to contain all cache lines. Therefore, the MRU line (i.e., one of the cache lines in the congruence class at the bottom of LRU tracker 602) is often considered to be the most likely line to be read next.

LRU tracker 602 includes several congruence classes, arranged based on an order in which their stored lines were most recently used. For example, as shown in FIG. 6A, one of lines 611-641 may be the least recently used cache line, resulting in congruence class 604 being at the top of LRU 602. Notably, the exact LRU line may not necessarily be tracked, conserving resources. However, in some instances, the MRU ordering of blocks within each congruence class may also be tracked.

Figure 6B:
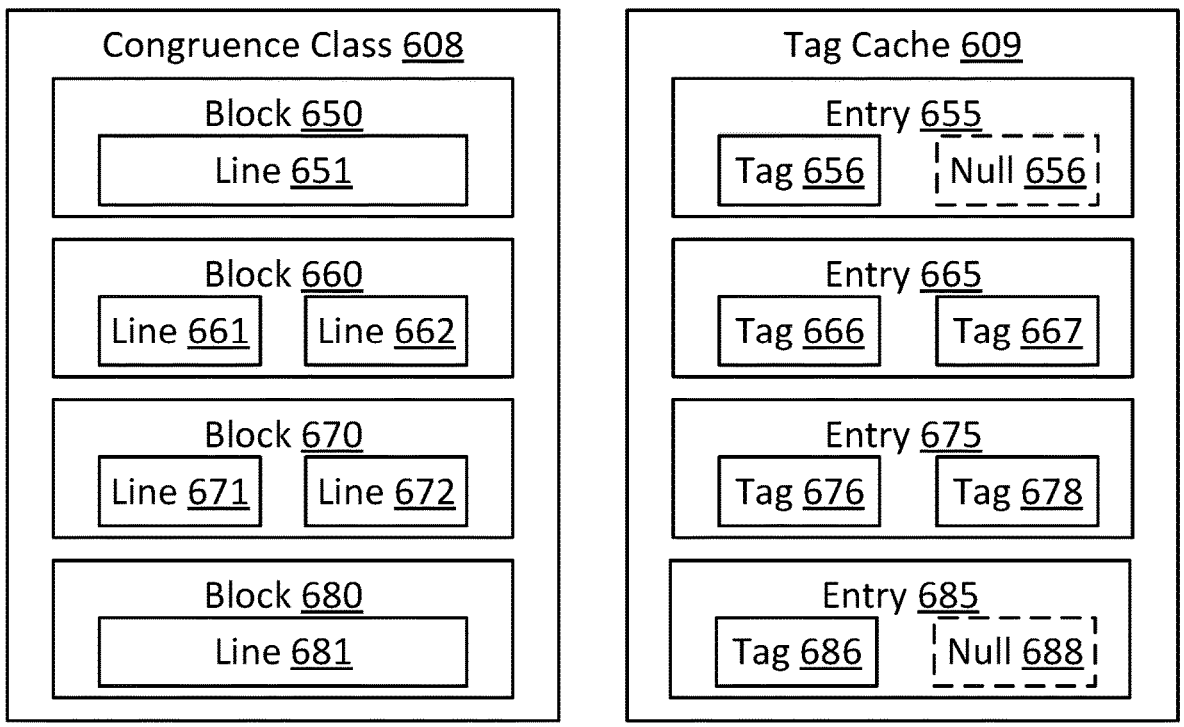
FIG. 6B is a diagram of a system including a congruence class and a tag cache, consistent with several embodiments of the present disclosure.

FIG. 6B is a diagram of a system 601 including a congruence class 608 and a tag cache 609. As shown in FIG. 6B, tag cache 609 maintains capacity for multiple tags for every block in congruence class 608, as these tags are not compressible. For example, tag entry 655 (associated with block 650) includes tag 656 (for line 651), but also includes null field 656. However, block 660 includes two lines, so entry 665 (associated with block 660) includes tag 666 for line 661 and tag 667 for line 662. Similarly, entry 675 includes tag 676 for line 671 and tag 678 for line 672. However, entry 685 includes tag 686 for line 681, but null space 688 as block 680 only includes a single (uncompressed) line. Thus, tag cache 609 maintains space for tags for lines, to allow tags to be tracked even when multiple lines are included within a given black.

FIG. 7 is a flowchart of a simple method 700 for dynamically adjusting cache compression, consistent with several embodiments of the present disclosure. Method 700 comprises monitoring a cache miss rate (i.e., a number of cache misses per unit time, such as misses per second) at operation 702. Operation 702 may include, for example, keeping a tally of cache misses and cache hits. In some instances, operation 702 may include calculating a cache miss ratio (i.e., the number of cache misses divided by the total number of attempts). However, for higher level caches such as an L3 cache, the miss rate (the number of cache misses) may be a more significant statistic than the miss ratio. The miss ratio and miss rate may be collectively referred to as a "miss profile." In other words, as used in this disclosure, a "miss profile" can refer to a miss ratio or a miss rate.

Method 700 further comprises comparing the monitored misses (e.g., miss rate or miss ratio, depending upon implementation) to a miss threshold at operation 704. The miss threshold can be predetermined or set by a user. As an example, the miss threshold may be set to a miss ratio of 10%, or 10,000 misses of the past 100,000 attempts. As another example, the miss threshold may be a miss rate of 1,000 misses per second.

If the miss rate is not below the miss threshold (704 "No"), method 700 further comprises enabling cache compression at operation 706. Operation 706 may include, for example, setting the value of a bit stored in a register to "1." This bit may be used to indicate whether lines being written to the cache should be compressed or not. A cache manager may check this bit when writing a line to a cache. Thus, operation 706 may result in lines being compressed as they are written to the cache. Of course, the bit may already have been "1" (i.e., compression may have been enabled prior to operation 706), but in such instances, checking the value of the bit may be more resource-intensive than simply overwriting it.

In some instances, lines may be written to the cache in an uncompressed state by default. In addition, operation 706 may include initiating a "compression pass" on the cache. For example, operation 706 may include scanning through the lines of the cache and compressing them. In order to do this, a system performing method 700 may utilize a table of lines that are designated "do not compress" or "cannot compress," initiating compression on lines that are outside of such a table and, in some instances, outside of a designated MRU group. Such a compression pass may be initiated in addition to or instead of enabling compression of lines being written to the cache.

Further, in some instances, operation 706 may include enabling automated compression of cache lines that "fall out" of an MRU group. For example, a set of 50 MRU cache lines may be kept uncompressed. If an additional line is written to the cache, the now-51st MRU line may be automatically compressed if compression is enabled. As a simpler example, a cache may keep the five MRU cache lines, designated A-E, uncompressed. Of those five lines, line "A" may be the most recently used, while line "E" may be the 5th-most recently used (i.e., line "E" may be the LRU of that particular MRU group). If a sixth line "F" is written to the cache, then line "E" is no longer within the 5 MRU lines. This can be described as line "E" falling out of the MRU group. Depending upon whether compression is enabled or disabled, line "E" may be automatically compressed or left in an uncompressed state, respectively. Operation 706 may include enabling such automated compression.

If the miss rate is below the miss threshold (704 "Yes"), method 700 further comprises disabling cache compression at operation 708. Operation 708 may include, for example, setting the value of the bit discussed above with reference to operation 706 to "0." Thus, operation 708 may result in lines being written to the cache uncompressed. As with operation 706, checking the value of the bit may be more resource-intensive than simply overwriting it.

In some instances, operation 708 may include disabling automated compression of lines "falling out" of an MRU subset.

In some instances, multiple bits and thresholds may be utilized for different forms of compression. For example, the register may support multiple bits to distinguish between "compression disabled," "first form of compression enabled," and "second form of compression enabled," where the different forms may result in differing levels of compression. As an example, a first form of compression may result in a moderate reduction in storage space required (e.g., 15%), but may take relatively few resources to decompress (e.g., 3 cycles per line decompression penalty). In contrast, a second form of compression may result in a significant reduction in storage space required (e.g., 40%), but may take more resources to decompress (e.g., 5 cycles per line decompression penalty). Thus, in some instances, if the miss rate is above a first threshold but below a second threshold, a system performing method 700 may enable the first form of compression, but if the miss rate is above both thresholds, the system may enable the second form of compression.

Enabling/disabling compression is likely to decrease/increase cache miss rate, respectively. Thus, method 700 may advantageously enable a system to toggle compression intelligently, causing a cache miss rate to trend toward a given threshold.

However, as toggling compression has at least some upfront resource cost, repeated toggling of compression may consume more resources than it saves. This potential problem is a form of "thrashing." Thus, in some instances, operations 704-708 may only be performed periodically (though the miss rate may be continually monitored, as represented by the dashed line). For example, a miss rate counter may be updated with every cache read attempt, but operation 704 may only be performed once every millisecond.

Another approach to mitigate "thrashing" issues is to utilize two miss thresholds: one for enabling compression, and one for disabling compression. For example, in some instances, while compression is enabled, a lower miss threshold may be utilized at operation 704 in determining whether to disable compression. If compression is disabled, a greater miss threshold may be utilized at operation 704 in determining whether to enable compression. This can allow for some flexibility/fluctuation before adjusting whether cache lines are to be compressed, which can help prevent thrashing issues, or at least mitigate them.

FIG. 8 is a flowchart of a method 800 of simulating cache miss rates for compressed and uncompressed caches, consistent with several embodiments of the present disclosure. Method 800 may be performed by an adaptive cache compressor such as, for example, adaptive compressor 106 of FIG. 1. Method 800 may be particularly useful in determining whether to compress a cache line or not, as discussed in further detail with reference to FIG. 9, below.

Method 800 comprises determining whether a cache read attempt results in a cache hit at operation 802. Operation 802 may be performed in a manner similar to those of the art; for example, a cache manager may receive a request for specific data from a processor and may check a table associated with a cache to identify whether the specific data is stored in the cache.

If the requested data is in the cache (a cache hit, 802 "Yes"), method 800 further comprises determining, at operation 810, whether the cache is compressed. Operation 810 may include, for example, checking a state of one or more indicator bits (e.g., line bits, congruence class bits, etc.). In some instances, operation 810 may include checking whether the specific cache line that resulted in the hit (the "hit line") was compressed. In some instances, operation 810 may include checking whether a majority of the lines in the cache is compressed, whether any of the cache is compressed, etc.

If the cache (or hit line, as applicable) is uncompressed (810 "No"), then no further analysis may be necessary, as the read attempt may have resulted in a hit regardless of whether the cache is compressed or not. Put differently, if the read attempt is a hit even in the scenario least likely to produce a hit (i.e., an uncompressed cache), then the read attempt would have been a hit regardless of other compression scenarios. In this path, method 800 ends at 812.

If the cache is compressed (810 "Yes"), method 800 further comprises determining whether the hit line was within a most recently used group ("MRU group" or "MRUG") at operation 814. Operation 814 may include, for example, checking a position of the hit line in an LRU stack. Operation 814 may be performed prior to updating the LRU stack (as the hit line may be moved to the bottom of the LRU stack as a result of being read). The MRU group can be a predefined range of positions in the LRU stack. Notably, in some instances content in the MRU group should not be compressed, but depending upon implementation, it may be possible. Thus, in some instances, checking the position of a compressed hit line may still be worthwhile.

Operation 814 may be particularly useful when a size of the MRUG corresponds to a maximum size of an uncompressed cache. This way, if the cache had been uncompressed, data outside the MRUG would have been evicted. Thus, if the data is in the cache but not in the MRUG, a system performing method 800 may be able to determine that the data would not have been in the cache had the cache been uncompressed.

If the hit line is within the MRU group (814 "Yes"), method 800 further comprises returning, at 816, that the read attempt may have still resulted in a hit even if the cache were uncompressed. In some instances, the size of the MRUG may be configured such that 814 "Yes" guarantees that the read attempt would have hit even in an uncompressed cache. However, even if the MRUG is smaller than the number of lines in an uncompressed cache, 814 "Yes" may still indicate that the read attempt would have been a likely hit in an uncompressed cache.

In some instances, the MRU group evaluation of operation 814 may account for multiple factors such as, for example, a ratio of MRU group size to total cache size and an evaluation of the line's position within the MRU group.

If the hit line is outside the MRU group (814 "No"), method 800 further comprises returning, at 818, that the read attempt likely would have missed had the cache been uncompressed. A likelihood that the read attempt would have missed had the cache been uncompressed may depend on a size of the MRUG. For example, If the MRUG has the same number of lines as an uncompressed cache, 818 may return a guarantee that the read attempt would have missed. 816 and 818 can be useful information in simulating whether compressing a cache is worth the added performance cost of decompressing.

If the read attempt results in a cache miss (802 "No"), method 800 further comprises determining whether the cache is compressed at operation 820. Operation 820 may be performed in a substantially similar manner to operation 810.

If the cache is compressed (820 "Yes"), method 800 may end at 822. Similar to 812, method 800 may end at 822 because compressing the cache likely would still have resulted in a miss, meaning no further analysis is needed.

If the cache is uncompressed (820 "No"), method 800 further comprises checking, at operation 824, whether an extended tag of the line resulting in the miss (the "miss line") is present in a tag cache. This tag cache essentially represents what the contents of the cache would be if the cache been compressed. Thus, if the extended tag of the line is absent from the tag cache (824 "No"), then method 800 further comprises returning, at 826, that the miss line would have been absent from the cache even if the cache were compressed. In contrast, if the tag is in the tag cache (824 "Yes"), method 800 further comprises returning, at 828, that the miss line would have been present in the cache, had the cache been compressed.

In some instances, operation 810 and/or operation 820 may consider types of compression as well. For example, operation 810 may include checking whether the hit line is compressed via a first compression method or a second compression method, where the first compression method results in more compression than the second. In such an example, if the hit line is compressed via the first compression method, method 800 may proceed to 814 as described above. However, if the hit line is compressed via the second compression method, method 800 may check whether the hit line is within a second MRU group. Method 800 may proceed to 826 or 828 depending upon the second MRU group, similarly to operation 814.

As an example, an uncompressed cache may store 1,000 lines, a cache compressed via the first compression method may store 2,000 lines, and a cache compressed via the second compression method may store 1,500 lines. The first MRU group may contain the 1,500 most-recently-used lines, while the second MRU group may contain the 1,000 most-recently-used lines. This way, if a cache is compressed via the first compression method, a check of whether a hit line is within the first MRU group (within the 1,500 MRU lines) can indicate whether the hit line still would have hit had the cache been compressed via the second compression method, but this may not definitively answer whether the hit line would have been a hit in an uncompressed cache. Meanwhile, a check of whether a hit line is within the second, smaller MRU group (within the 1,000 MRU lines) can indicate whether the hit line still would have hit had the cache been uncompressed entirely. This may be particularly useful, as the second compression method may be less resource-intensive than the first compression method, so if the hit line would have missed in an uncompressed cache but still would have hit in a less-demanding compressed cache, the system may be enabled to intelligently switch from the first compression method to the second compression method.

As described above, the MRU tracking by the predictor may be on a congruence class basis, as opposed to a direct line-by-line tracking basis. For example, an MRU group may be the previous 500 congruence classes, where each congruence class may include, for example, 4, 8, or 16 lines. Thus, the predictor may not need to have capacity to store an entry for every cache line being tracked; for an MRU group of 2,000 lines in a cache having congruence classes of 4 lines each, the predictor may only need to track 500 congruence classes. However, this may result in reduced accuracy, as the most recently used congruence class may contain lines that have not necessarily been used particularly recently.

FIG. 9 is a flowchart of a method 900 of adaptive cache compression based on simulated miss rates, consistent with several embodiments of the present disclosure. As an overview, a system performing method 900 may maintain at least two running tallies of CPU cycles as the system operates; a first tally may represent a number of cycles required to accommodate read requests assuming a cache is uncompressed, and a second tally may represent a number of cycles required to accommodate read requests assuming the cache is compressed. In order to do this, a system performing method 900 may determine, with each read request resulting in a check of the cache, whether the read request would have resulted in a hit or a miss if the cache was compressed and whether it would have resulted in a hit or a miss if the cache was uncompressed. Thus, upon a read request being satisfied, the system performing method 900 may add a first amount of cycles to a first "compressed" estimate and a second amount of cycles to a second "uncompressed" estimate.

The specifics of each operation of method 900 are discussed in detail below, but in essence, FIG. 9 depicts four scenarios. In the first scenario, method 900 determines that a cache hit (902 "Yes") would have hit regardless of whether the cache had been compressed or uncompressed (910 "Yes"). In the second scenario, method 900 determines that a cache hit (902 "Yes") in a compressed cache would have missed if the cache had been uncompressed (910 "No"). In the third scenario, method 900 determines that a cache miss (902 "No") in an uncompressed cache would have hit if the cache had been compressed (930 "Yes"). In the fourth scenario, method 900 determines that a cache miss (902 "No") would have missed regardless of whether the cache had been compressed or uncompressed (930 "No").

In each of these four scenarios, a first number of cycles is added to a "compressed" estimate and a second number of cycles is added to an "uncompressed" estimate. Operations 912, 922, and 932 describe amounts of cycles added to the compressed estimate, while operations 914, 924, and 934 describe amounts of cycles added to the uncompressed estimate. For example, if the read request is a cache miss (902 "No") and would have been a miss regardless of whether the cache was compressed or not (930 "No"), method 900 adds to the compressed estimate (932) and also adds to the uncompressed estimate (934).

Notably, 910 "No" and 930 "Yes" both lead to 922 and 924. This is because these two scenarios (i.e., 910 "No" and 930 "Yes") describe situations where a compressed cache yields a hit but an uncompressed cache yields a miss.

In some instances, one of these amounts of cycles may be an actual realized amount, rather than an estimated amount. For example, if a read request results in a cache hit (902 "Yes") in a compressed cache, but the cache hit would have been a cache miss if the cache were uncompressed (910 "No"), then the system performing method 900 may add the actual amount of cycles required to satisfy the read request to a "compressed" estimate (922), and add an estimated amount of cycles required to satisfy the read request to the "uncompressed" estimate (924). In some instances, the system may utilize estimates for both to maintain consistency.

Method 900 comprises determining whether a cache read attempt results in a cache hit at operation 902. Operation 902 may be performed in a manner similar to those of the art; for example, a cache manager may receive a request for specific data from a processor and may check a table associated with a cache to identify whether the specific data is stored in the cache.

If the requested data is in the cache (a cache hit, 902 "Yes"), method 900 further comprises determining, at operation 910, whether the request would have resulted in a hit if the cache was uncompressed. Operation 910 may be performed in a manner similar to operations 802 "Yes" to 818 of method 800, described above with reference to FIG. 8. For example, operation 910 may include determining whether the cache is compressed and whether the line that resulted in the hit (the "hit line") was in a "most recently used group" (MRUG) in the LRU stack. For example, referring back to FIG. 6A, a system performing method 900 may check an LRU stack such as LRU tracker 602, and determine whether the hit line is within an MRU group and/or congruence class. Thus, operation 910 may include checking the address of the hit line, and determining whether it falls within a designated MRUG.

If the read request would have been a hit in an uncompressed cache (910 "Yes"), then it also would have been a hit in a compressed cache. A hit in an uncompressed cache still requires a certain amount of cycles to return the hit line. A hit in a compressed cache requires at least that same amount of cycles to return the hit line, plus an additional amount of cycles to decompress the hit line (the "decompression penalty"). Therefore, in the case of 910 "Yes," method 900 further comprises adding an estimated (or realized) amount of cycles needed to return the hit line, plus a decompression penalty, to a "compressed" estimate (or "tally") at operation 912. For example, a cache hit may require 8 cycles to return the hit line, but if the cache is compressed, the hit line may need to be decompressed as well, resulting in a "decompression penalty" of 4 cycles. In such a situation, operation 912 may include adding 8+4=12 cycles to a "compressed" estimate. Method 900 further comprises adding a hit cycle cost to an "uncompressed" estimate at operation 914. Continuing with the previous example, operation 914 may include adding 8 cycles to an "uncompressed" estimate; while the compressed estimate requires 8 cycles to return the hit line and an additional 4 cycles to decompress the returned hit line, the uncompressed estimate only requires the 8 cycles to return the hit line.

If the read request is a cache hit (902 "Yes") but the read request would not have been a hit in an uncompressed cache (910 "No"), method 900 further comprises adding the hit and decompression cycle cost to the compressed estimate at operation 922. Operation 922 may be performed in a substantially similar manner as operation 912. Method 900 further comprises adding a miss cycle cost to an uncompressed estimate at operation 924. Operation 924 may include, for example, estimating an amount of cycles required to retrieve the cache line from a higher level cache or from memory (e.g., 100 cycles).

As described above, in some instances, operation 922 may be performed utilizing a realized/tracked cycle count rather than an estimate. This is possible because, as the read request resulted in a hit (902 "Yes"), then the hit line has been (or will be) returned. Further, as the hit would have been a miss in an uncompressed cache (910 "No"), the cache is at least partially compressed, so the hit line may incur a decompression penalty. Returning the hit line and decompressing it (if necessary) may be associated with typical cycle costs used in the various estimates, but these typical cycle costs may not be guaranteed. Thus, rather than estimate an amount of cycles required to perform something that has actually been performed (i.e., returning and decompressing the hit line), operation 922 may include adding an actual amount of cycles required.

If the read request results in a cache miss (902 "No"), method 900 further comprises determining, at operation 930, whether the cache miss would have been a cache miss had the cache been compressed. Operation 930 may be performed in a manner similar to operations 820-828 of method 800, described above with reference to FIG. 8. For example, operation 930 may include determining whether the cache is currently compressed. If the cache is already fully compressed, then 902 "No" may automatically mean 930 "No"; the read request would not have hit in a compressed cache, because it did not hit in a compressed cache. If the cache could be further compressed (e.g., if the cache is completely uncompressed or only partially compressed), operation 930 may include checking a tag array to identify whether the requested line would have been in the cache had it been (more) compressed, as discussed above with reference to operation 824 of method 800.

If the read request would have resulted in a hit in a compressed cache (930 "Yes"), method 900 further comprises adding a hit cycle cost and a decompression cycle cost to the compressed estimate at operation 922, and adding the miss cycle cost to the uncompressed estimate at operation 924. Operations 922 and 924 may be performed in a substantially similar manner as described above with reference to 910 "No," although when arrived at via 930 "Yes," operation 922 may be based on simulated costs while operation 924 may be performed with realized costs, whereas when arrived at via 910 "No," operation 922 may be performed with realized costs while operation 924 may be performed with simulated costs. As mentioned previously, in some instances, both operation 922 and operation 924 may be performed using simulated costs.

If the read request would have resulted in a miss in a compressed cache (930 "No"), method 900 further comprises adding a miss cost to the compressed estimate at operation 932. Method 900 further comprises adding the miss cost to the uncompressed estimate at operation 934. In some instances, the miss cost may be identical whether the cache is compressed or not. Thus, in some instances, both operations 932 and 934 may be performed using an actual cycle cost.

Once the estimates are updated, method 900 continues monitoring read requests, depicted in FIG. 9 as block 940. For example, after a first read request, a system performing method 900 might update a compressed estimate and an uncompressed estimate, and then await a next read request in order to further update both estimates. Monitoring via operations 902-940 may continue until, for example, a threshold number of read requests has been met (e.g., 10,000), at which point method 900 may proceed to compare the total cycles required at operation 950.

Operation 950 may include, for example, inputting the compressed estimate (representing the total amount of cycles a system would have required to accommodate the various read requests using a compressed cache) and the uncompressed estimate (representing the total amount of cycles the system would have required to accommodate the read requests using an uncompressed cache) into a comparator to determine which is greater. In essence, operation 950 enables a system performing method 900 to simulate performance of a single cache in both an uncompressed state and a compressed state, and thus determine which state would perform faster.

If the amount of cycles tallied in the uncompressed estimate is greater than the amount of cycles tallied in the compressed estimate (950 "Yes"), method 900 further comprises enabling compression at 952. For example, 952 may include setting a bit in a register to indicate that incoming cache lines should be compressed. In some instances, compression may already be enabled, in which case block 952 may include maintaining compression.

In some instances, 952 may include performing a compression pass on the cache, checking each line and determining whether the line should be compressed or not (based on, for example, the contents of the line or position within the LRU stack). As an example, 950 "Yes" may indicate that the cache should be compressed via 952. 952 may therefore include checking a first line of the cache to determine if the first line of the cache is compressible. If the line is compressible, 952 may also include determining a location within the LRU stack of the line. If the line is within an MRU group of the LRU stack, 952 may not include compressing the line. If the line is outside the MRU group, 952 may include compressing the line. 952 may perform this check on each line of the cache. Notably, performing this process repeatedly may be prohibitively resource-intensive, so 952 may be performed when a determination is made (via 902-950 "Yes") that a compression pass is prudent.

In contrast, if the amount of cycles tallied in the uncompressed estimate is less than the amount of cycles tallied in the compressed estimate (950 "No"), method 900 further comprises disabling compression at 954. For example, 954 may include setting a bit in a register to indicate that incoming cache lines should not be compressed. In some instances, compression may already be disabled (e.g., the register value may already indicate that incoming cache lines should not be compressed), in which case 954 may maintain the disabled state.

In some instances, 954 may include decompressing previously-compressed lines in the cache. This may require evicting some lines to make room for the newly-decompressed lines. Eviction of lines may be performed according to various existing eviction policies (e.g., First-In-First-Out (FIFO), LRU-based eviction, etc.).

In some instances, 954 may include performing a decompression pass on the cache, determining on a line-by-line (or, in some instances, congruence class-by-congruence class) basis whether compressed lines should be decompressed (based, for example, on their LRU or MRU stack position). For example, 954 may include identifying a first compressed cache line and a second compressed cache line. 954 may further include identifying an LRU stack position of both the first and second compressed cache lines, and, for each compressed cache line, compare its LRU stack position to a decompression threshold. For example, the decompression threshold may result in decompression of compressed cache lines that were among the five most recently used lines. In such an example, the first compressed cache line may have been the third-most-recently used, while the second compressed cache line may have been the thirtieth-most-recently used. As a result, 954 may decompress the first compressed cache line, but leave the second compressed cache line compressed.

In some instances, the compression or decompression passes described above may only be performed on non-MRU lines (i.e., lines deemed to be outside of the MRU group). This may save resources, as lines within the MRU may be assumed to be uncompressed regardless of whether compression is enabled or disabled.

In some instances, the compression or decompression passes described above may be performed on a congruence class basis; in other words, operation 954 may include analyzing only congruence classes that are indicated to include one or more compressed lines, whereas operation 952 may include analyzing all congruence classes to identify whether any lines within can and should be compressed.

In some instances, the comparison at 950 may only result in changes to compression if the difference between the number of uncompressed cycles and the number of compressed cycles exceeds a certain value. In other words, 950 may result in looping back to 902 if the numbers of cycles are similar (e.g., within a given threshold).

In some instances, the compressed and uncompressed estimates may be updated based on specific compression settings. For example, a cache line may be incompressible; adding a hit and decompression cycle cost to a "compressed" estimate for an incompressible line may improperly simulate compressed performance. Further, some lines may technically be compressible, but compressing them may not be preferable for reasons outside of method 900. For example, compressing a most-recently used line may result in reduced performance, as it may be likely to be used again (incurring the decompression penalty) before the benefits from the compression can be realized. Thus, in some instances, operations 910 and 930 may also account for whether the line is compressible and/or should be compressed. If the line is incompressible or should not be compressed, the compressed estimate may be updated with the same amount of cycles as the uncompressed estimate (to reflect that the line would not have been compressed, even in a "compressed" cache). For example, an incompressible line may result in a cache hit (902 "Yes"), operation 910 may determine that the line would have hit if the cache were uncompressed (910 "Yes"), but as the line is incompressible, operation 912 may add the hit cycle cost to the compressed estimate without adding the decompression penalty. Thus, operations 912 and 914 may add the same amount of cycles to their respective estimates.

Figure 10:
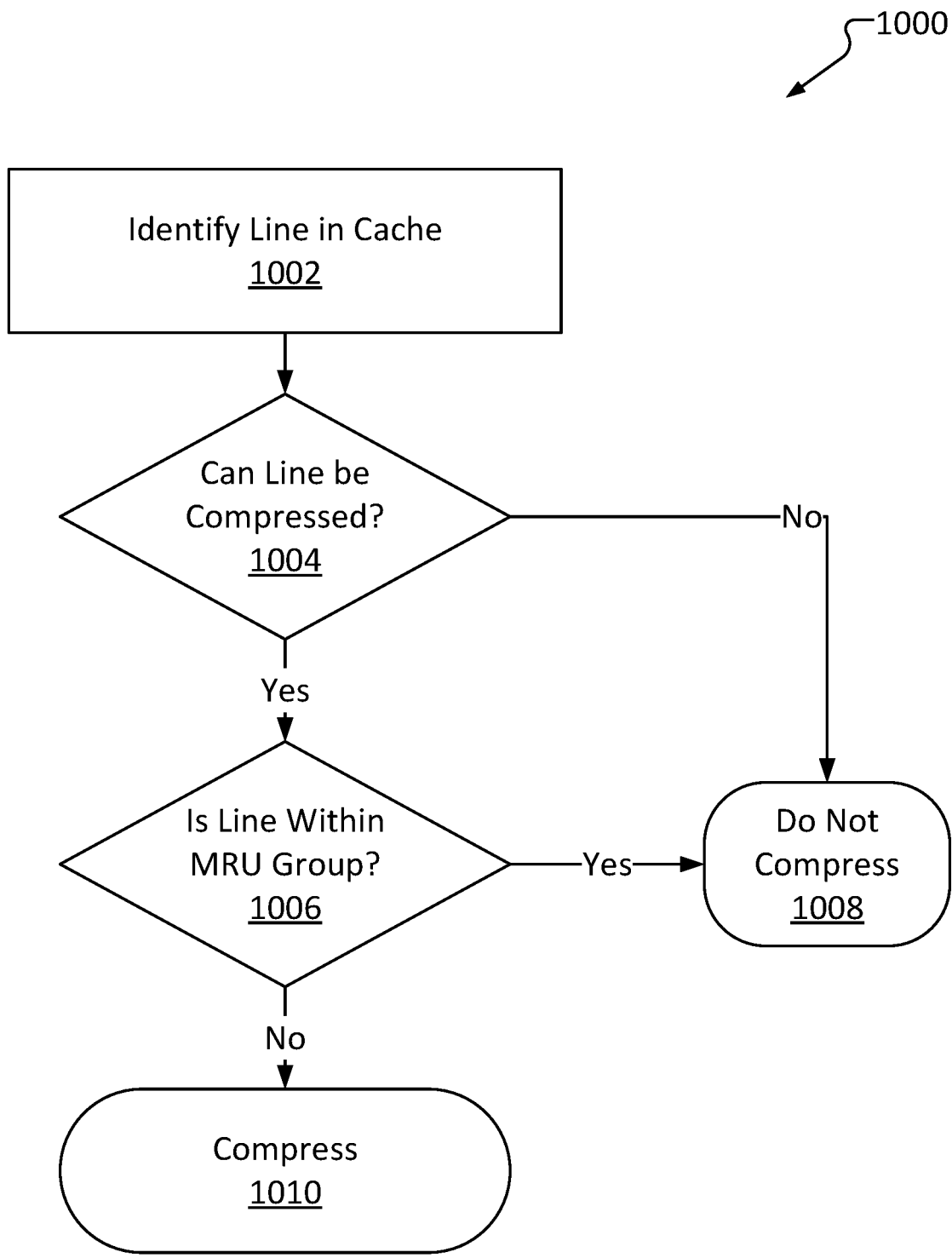
FIG. 10 is a flowchart of a method for determining whether to compress a cache line, consistent with several embodiments of the present disclosure.

FIG. 10 is a flowchart of a method 1000 for determining whether to compress a cache line, consistent with several embodiments of the present disclosure. Method 1000 may be performed repeatedly as part of a "compression pass" over the cache. For example, in some instances, method 1000 may be performed as part of 952 of method 900, described above with reference to FIG. 9. This way, method 1000 can be performed to adaptively compress cache lines on a line-by-line basis.

Method 1000 comprises identifying a line in a cache at operation 1002. Operation 1002 may include, for example, iterating through addresses in a cache and selecting a line that has not been analyzed for compression during the current compression pass. As one example, a bit may be utilized to indicate whether the line has been analyzed for compression; this bit may be initialized to "0" and set to "1" whenever a line is checked via operation 1002. Operation 1002 may therefore include selecting a line whose bit is still "0," to prevent redundancy. At the end of method 1000, all of these bits may be reset to "0" to allow for a later compression pass. In some instances, lines which are incompressible may have their bits remain set to "1" (or a different bit may be utilized and checked to indicate this).

In some instances, method 1000 may be performed on incoming cache lines (e.g., lines about to be written to the cache, such as the L3 cache). In such instances, operation 1002 may include detecting a line being evicted from a lower-level cache (which may result in the line being written to a higher-level cache). In some instances, operation 1002 may include detecting a cache miss; the requested data may be retrieved from memory and then written to a cache.

Method 1000 further comprises determining whether the line can be compressed at operation 1004. Operation 1004 may include, for example, evaluating contents of a payload of the line. Referring briefly back to FIG. 5, operation 1004 may include evaluating payload 537 to determine whether it can be compressed or not. As an example, cached instructions may be incompressible, while data may be compressible. However, not all data lines are necessarily compressible; compressibility of a data line can vary based upon bit patterns within the line.

If the line is incompressible (1004 "No"), method 1000 ends without compressing the line at 1008. If the line is compressible (1004 "Yes"), method 1000 further comprises checking whether the line is within a most recently used (MRU) group at operation 1006. Operation 1006 may include, for example, checking an address or tag of the line and comparing it to an LRU stack or a tag array to determine when the line was most recently used. The MRU group can be defined based on size of a cache, compression method, etc.

If the line is within the MRU group (1006 "Yes"), method 1000 may end without compressing the line at 1008. This can be advantageous because, even if the line is compressible, being in an MRU group may indicate that the line is likely to be utilized again relatively soon. Thus, were the system performing method 1000 to compress the line, it would need to be decompressed prior to being utilized, incurring a decompression penalty. As a result, compressing a line that is likely to be used soon might cost more resources than it saves.

In contrast, if the line is not within the MRU group (1006 "No"), method 1000 further comprises compressing the line at 1010. Thus, method 1000 may advantageously enable compressing lines that are unlikely to be utilized in the near future, while leaving lines that are likely to be utilized in an uncompressed state. This adaptive compression can provide substantial benefits in cache utilization over the art.

In some instances, method 1000 may further include checking whether the line is in a "least recently used" (LRU) group. The LRU group may represent cache lines that are particularly unlikely to be utilized. For example, while the MRU group may be the 10% most recently used lines, the LRU group may be the 10% least recently used cache lines. The line being absent from the MRU group may indicate that the line is unlikely to be utilized soon, and thus that compressing the line may enable writing additional lines to the cache. However, being in the LRU group may indicate that the line is so unlikely to be utilized that the line may be evicted before being utilized.

Figure 11:
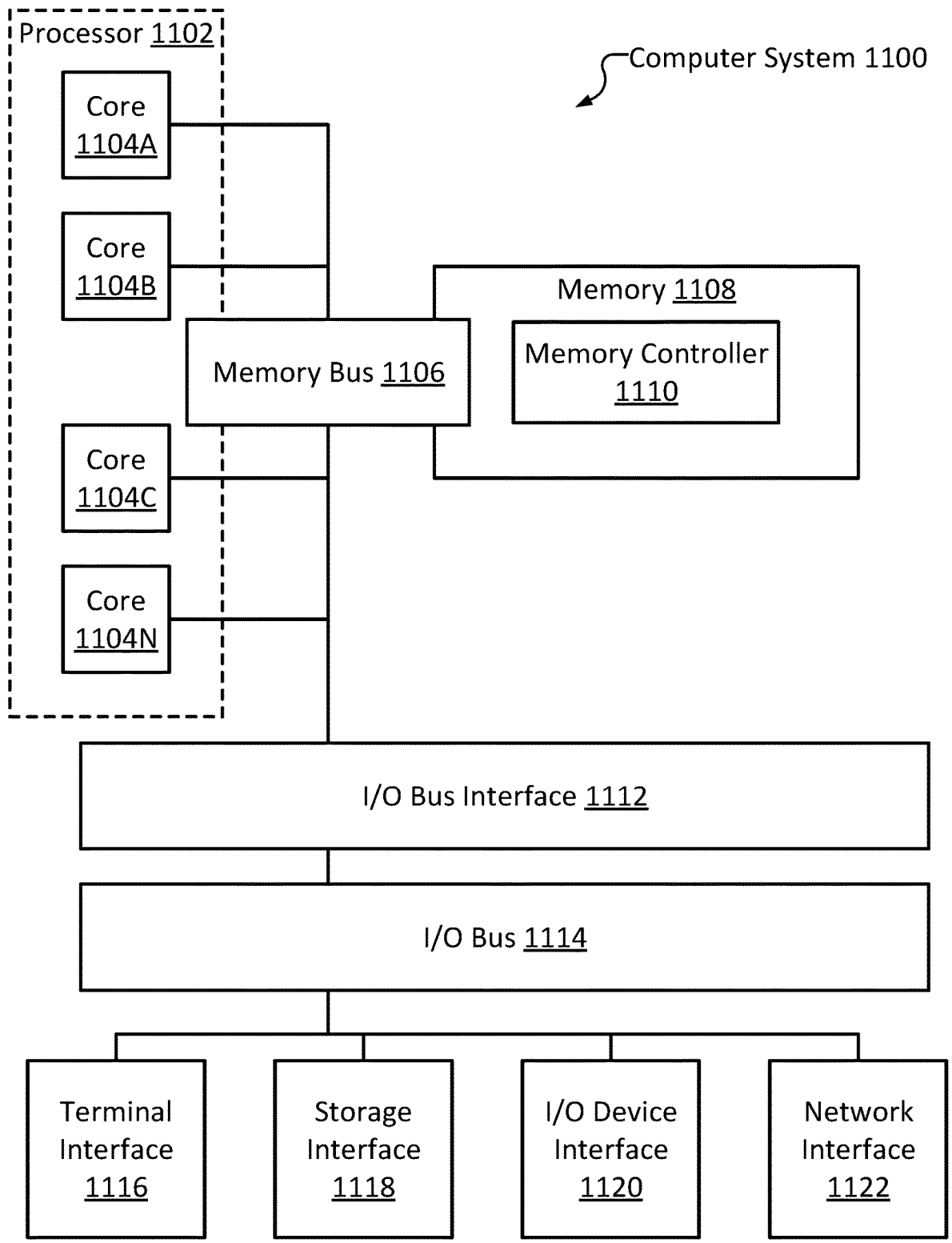
FIG. 11 illustrates a high-level block diagram of an example computer system that may be used in implementing embodiments of the present disclosure.

Referring now to FIG. 11, shown is a high-level block diagram of an example computer system 1100 that may be configured to perform various aspects of the present disclosure, including, for example, methods 300 and 700-1000, respectively. The example computer system 1100 may be used in implementing one or more of the methods or modules, and any related functions or operations, described herein (e.g., using one or more processor circuits or computer processors of the computer), in accordance with embodiments of the present disclosure. In some embodiments, the major components of the computer system 1100 may comprise one or more CPUs 1102, a memory subsystem 1108, a terminal interface 1116, a storage interface 1118, an I/O (Input/Output) device interface 1120, and a network interface 1122, all of which may be communicatively coupled, directly or indirectly, for inter-component communication via a memory bus 1106, an I/O bus 1114, and an I/O bus interface unit 1112.

The computer system 1100 may contain one or more general-purpose programmable central processing units (CPUs) 1102, some or all of which may include one or more cores 1104A, 1104B, 1104C, and 1104D, herein generically referred to as the CPU 1102. In some embodiments, the computer system 1100 may contain multiple processors typical of a relatively large system; however, in other embodiments the computer system 1100 may alternatively be a single CPU system. Each CPU 1102 may execute instructions stored in the memory subsystem 1108 on a CPU core 1104 and may comprise one or more levels of on-board cache.

In some embodiments, the memory subsystem 1108 may comprise a random-access semiconductor memory, storage device, or storage medium (either volatile or non-volatile) for storing data and programs. In some embodiments, the memory subsystem 1108 may represent the entire virtual memory of the computer system 1100 and may also include the virtual memory of other computer systems coupled to the computer system 1100 or connected via a network. The memory subsystem 1108 may be conceptually a single monolithic entity, but, in some embodiments, the memory subsystem 1108 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 1102. This may include a memory controller 1110.

Although the memory bus 1106 is shown in FIG. 11 as a single bus structure providing a direct communication path among the CPU 1102, the memory subsystem 1108, and the I/O bus interface 1112, the memory bus 1106 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1112 and the I/O bus 1114 are shown as single respective units, the computer system 1100 may, in some embodiments, contain multiple I/O bus interface units 1112, multiple I/O buses 1114, or both. Further, while multiple I/O interface units are shown, which separate the I/O bus 1114 from various communications paths running to the various I/O devices, in other embodiments some or all of the I/O devices may be connected directly to one or more system I/O buses.

In some embodiments, the computer system 1100 may be a multi-user mainframe computer system, a single-user system, or a server computer or similar device that has little or no direct user interface but receives requests from other computer systems (clients). Further, in some embodiments, the computer system 1100 may be implemented as a desktop computer, portable computer, laptop or notebook computer, tablet computer, pocket computer, telephone, smart phone, mobile device, or any other appropriate type of electronic device.

It is noted that FIG. 11 is intended to depict the representative major components of an exemplary computer system 1100. In some embodiments, however, individual components may have greater or lesser complexity than as represented in FIG. 11, components other than or in addition to those shown in FIG. 11 may be present, and the number, type, and configuration of such components may vary.

What is claimed is:

1. A central processing unit (CPU) system, comprising:
a first cache;
a CPU core coupled to the first cache; and
an adaptive compressor coupled to the CPU core, the adaptive compressor configured to:

monitor a miss profile of the first cache, wherein the miss profile is selected from a group consisting of: a miss ratio and a miss rate;
compare the miss profile to a miss threshold; and
determine, based on the comparing, whether to enable compression of the first cache.

2. The CPU system of claim 1, wherein the adaptive compressor is further configured to compress, based on the determining, the first cache, the compressing including:
identifying a first line in the first cache;
determining that the first line is not within a most recently used (MRU) group in the first cache; and
compressing, based on the determining that the first line is not within the MRU group, the first line.

3. The CPU system of claim 2, wherein the compressing further includes:
identifying a second line in the first cache;
determining that the second line is within a most recently used (MRU) group in the first cache; and
determining, based on the determining that the second line is within the MRU group, not to compress the second line.

4. The CPU system of claim 1, wherein the adaptive compressor is further configured to compress, based on the determining, the first cache, the compressing including:
identifying a first congruence class in the first cache, the first congruence class including a first plurality of lines;
determining that the first congruence class is not within a most recently used (MRU) group of congruence classes in the first cache; and
compressing, based on the determining that the first congruence class is not within the MRU group, the first congruence class.

5. The CPU system of claim 4, wherein:
the first plurality of lines includes:
a first subset of lines, wherein each line of the first subset of lines is a compressible line; and
a second subset of lines, wherein each line of the second subset of lines is an incompressible line; and
the compressing the first congruence class includes compressing each of the first subset of lines.

6. The CPU system of claim 5, wherein:
the first subset of lines includes data lines; and
the second subset of lines includes instruction lines.

7. The CPU system of claim 4, wherein the compressing further includes:
identifying a second congruence class in the first cache, the second congruence class including a second plurality of lines;
determining that the second congruence class is within a most recently used (MRU) group of congruence classes in the first cache; and
determining, based on the determining that the second congruence class is within the MRU group, not to compress the second congruence class.

8. The CPU system of claim 1, wherein the adaptive compressor is further configured to:
detect that a cache line in the first cache has fallen out of a most recently used (MRU) group;
determine that compression is enabled for the first cache; and
compress, responsive to the detecting and the determining that compression is enabled, the cache line.

9. The CPU system of claim 1, wherein the adaptive compressor is further configured to:
detect that a congruence class in the first cache has fallen out of a most recently used (MRU) group of congruence classes, the congruence class including a plurality of lines;
determine that compression is enabled for the first cache; and
compress, responsive to the detecting and the determining that compression is enabled, the congruence class.

10. The CPU system of claim 1, wherein the miss profile is a miss rate.

11. A central processing unit (CPU) system, comprising:
a first cache including a first cache line;
a CPU core coupled to the first cache; and
an adaptive compressor coupled to the CPU core, the adaptive compressor configured to:
detect a read request of the first cache line;
simulate a first performance of the first cache in a first scenario in which the first cache line is compressed;
simulate a second performance of the first cache in a second scenario in which the first cache line is uncompressed;
compare the first performance to the second performance; and
determine, based on the comparison, whether to compress the first cache.

12. The CPU system of claim 11, wherein the adaptive compressor is further configured to maintain a most recently used (MRU) cache line tracker, wherein the simulating the first performance and the simulating the second performance include checking the MRU cache line tracker for an MRU position of the first cache line.

13. The CPU system of claim 11, wherein the adaptive compressor is further configured to maintain a most recently used (MRU) congruence class tracker, wherein the simulating the first performance and the simulating the second performance include checking the MRU congruence class tracker for an MRU position of a congruence class including the first cache line.

14. The CPU system of claim 11, wherein the simulating the first performance includes:
determining that the read request resulted in a cache miss;
determining that the read request would not have resulted in the cache miss in the first scenario; and
adding, based on the determining that the read request would not have resulted in the cache miss, a first cycle cost to a compressed estimate.

15. The CPU system of claim 14, wherein the first cycle cost includes a miss cycle cost.

16. The CPU system of claim 11, wherein the simulating the second performance includes:
determining that the read request resulted in a cache hit;
determining that the read request would not have resulted in the cache hit in the second scenario; and
adding, based on the determining that the read request would not have resulted in the cache hit, a second cycle cost to a compressed estimate.

17. The CPU system of claim 16, wherein the second cycle cost includes:
a hit cycle cost; and
a decompression cycle cost.

18. The CPU system of claim 11, wherein the CPU is further configured to compress, based on the determining, the first cache, wherein the compressing includes:
identifying a second line in the first cache;
determining that the second line is within a most recently used (MRU) group in the first cache; and determining, based on the determining that the second line is within the MRU group, not to compress the second line.

19. The CPU system of claim 11, wherein the CPU is further configured to compress, based on the determining, the first cache, wherein the compressing includes:
identifying a third line in the first cache;
determining that the third line is not within a most recently used (MRU) group in the first cache; and
compressing, based on the determining that the third line is not within the MRU group, the third line.

20. A central processing unit (CPU) system, comprising:
a first cache including a first cache line;
a CPU core coupled to the first cache; and
an adaptive compressor coupled to the CPU core, the adaptive compressor configured to:
identify whether the first cache line is within a most-recently-used (MRU) group of a least-recently-used (LRU) stack; and
determine, based on the identifying, whether to compress the first cache line.

* * * * *